(12) United States Patent
Atwell et al.

(10) Patent No.: US 8,615,893 B2
(45) Date of Patent: Dec. 31, 2013

(54) PORTABLE ARTICULATED ARM COORDINATE MEASURING MACHINE HAVING INTEGRATED SOFTWARE CONTROLS

(75) Inventors: Paul C. Atwell, Lake Mary, FL (US);
Clark H. Briggs, DeLand, FL (US);
Burnham Stokes, Lake Mary, FL (US)

(73) Assignee: Faro Technologies, Inc., Lake Mary, FL (US)

( * ) Notice: Subject to any disclaimer, the term of this patent is extended or adjusted under 35 U.S.C. 154(b) by 65 days.

(21) Appl. No.: 13/400,840

(22) Filed: Feb. 21, 2012

(65) Prior Publication Data

US 2012/0144685 A1 Jun. 14, 2012

Related U.S. Application Data

(63) Continuation-in-part of application No. 13/006,484, filed on Jan. 14, 2011, and a continuation-in-part of application No. 13/006,503, filed on Jan. 14, 2011, now Pat. No. 8,276,286, and a continuation-in-part of application No. 13/006,455, filed on Jan. 14, 2011.

(60) Provisional application No. 61/296,555, filed on Jan. 20, 2010.

(51) Int. Cl.
*G01B 5/008* (2006.01)

(52) U.S. Cl.
USPC .............................. 33/503; 33/1 PT

(58) Field of Classification Search
USPC .................. 33/503, 1 N, 1 PT, 534
See application file for complete search history.

(56) References Cited

U.S. PATENT DOCUMENTS

| 1,535,312 A | 4/1925 | Hosking |
| 1,918,813 A | 2/1932 | Kinzy |
| 2,316,573 A | 4/1940 | Egy |
| 2,333,243 A | 11/1943 | Glab |
| 2,702,683 A | 2/1955 | Green et al. |

(Continued)

FOREIGN PATENT DOCUMENTS

| CN | 2236119 | 9/1996 |
| CN | 2508896 | 9/2002 |

(Continued)

OTHER PUBLICATIONS

Japanese Office Action and English Language summary for JP2012-550042 filed Jul. 20, 2012; based on International Application No. PCT/US2011/021249 filed Jan. 14, 2011.

(Continued)

*Primary Examiner* — Yaritza Guadalupe-McCall
(74) *Attorney, Agent, or Firm* — Cantor Colburn LLP

(57) ABSTRACT

A method for performing a diagnostic or calibration procedure on a portable articulated arm coordinate measurement machine (AACMM). The AACMM includes a manually positionable articulated arm portion having opposed first and second ends, the arm portion including a plurality of connected arm segments, each of the arm segments including at least one position transducer for producing position signals. The AACMM also includes an electronic circuit having a self-contained operating environment that includes a user interface application and a display device in communication with the user interface application. In addition, a measurement device is attached to the first end of the AACMM. The user interface application and display device are configured to facilitate performing and displaying results of a diagnostic or calibration procedure on the AACMM.

9 Claims, 19 Drawing Sheets

(56) References Cited

U.S. PATENT DOCUMENTS

| | | |
|---|---|---|
| 2,748,926 A | 6/1956 | Leahy |
| 2,983,367 A | 6/1958 | Paramater et al. |
| 2,924,495 A | 9/1958 | Haines |
| 2,966,257 A | 11/1959 | Littlejohn |
| 3,066,790 A | 12/1962 | Armbruster |
| 3,458,167 A | 7/1969 | Cooley, Jr. |
| 4,138,045 A | 2/1979 | Baker |
| 4,340,008 A | 7/1982 | Mendelson |
| 4,379,461 A | 4/1983 | Nilsson et al. |
| 4,424,899 A | 1/1984 | Rosenberg |
| 4,430,796 A | 2/1984 | Nakagawa |
| 4,457,625 A | 7/1984 | Greenleaf et al. |
| 4,506,448 A | 3/1985 | Topping et al. |
| 4,537,233 A | 8/1985 | Vroonland et al. |
| 4,606,696 A | 8/1986 | Slocum |
| 4,659,280 A | 4/1987 | Akeel |
| 4,663,852 A | 5/1987 | Guarini |
| 4,664,588 A | 5/1987 | Newell et al. |
| 4,676,002 A | 6/1987 | Slocum |
| 4,714,339 A | 12/1987 | Lau et al. |
| 4,751,950 A | 6/1988 | Bock |
| 4,790,651 A | 12/1988 | Brown et al. |
| 4,816,822 A | 3/1989 | Vache et al. |
| 4,882,806 A | 11/1989 | Davis |
| 4,954,952 A | 9/1990 | Ubhayakar et al. |
| 4,982,841 A | 1/1991 | Goedecke |
| 4,996,909 A | 3/1991 | Vache et al. |
| 5,025,966 A | 6/1991 | Potter |
| 5,027,951 A | 7/1991 | Johnson |
| 5,189,797 A | 3/1993 | Granger |
| 5,205,111 A | 4/1993 | Johnson |
| 5,211,476 A | 5/1993 | Coudroy |
| 5,213,240 A | 5/1993 | Dietz et al. |
| 5,219,423 A | 6/1993 | Kamaya |
| 5,239,855 A | 8/1993 | Schleifer et al. |
| 5,289,264 A | 2/1994 | Steinbichler |
| 5,289,855 A | 3/1994 | Baker et al. |
| 5,319,445 A | 6/1994 | Fitts |
| 5,332,315 A | 7/1994 | Baker et al. |
| 5,372,250 A | 12/1994 | Johnson |
| 5,373,346 A | 12/1994 | Hocker |
| 5,402,582 A | 4/1995 | Raab |
| 5,412,880 A | 5/1995 | Raab |
| 5,430,384 A | 7/1995 | Hocker |
| 5,455,670 A | 10/1995 | Payne et al. |
| 5,455,993 A | 10/1995 | Link et al. |
| 5,510,977 A | 4/1996 | Raab |
| 5,528,505 A | 6/1996 | Granger et al. |
| 5,535,524 A | 7/1996 | Carrier et al. |
| 5,611,147 A | 3/1997 | Raab |
| 5,623,416 A | 4/1997 | Hocker, III |
| 5,682,508 A | 10/1997 | Hocker, III |
| 5,724,264 A | 3/1998 | Rosenberg et al. |
| 5,752,112 A | 5/1998 | Paddock et al. |
| 5,754,449 A | 5/1998 | Hoshal et al. |
| 5,768,792 A | 6/1998 | Raab |
| 5,829,148 A | 11/1998 | Eaton |
| 5,832,416 A | 11/1998 | Anderson |
| 5,887,122 A | 3/1999 | Terawaki et al. |
| 5,926,782 A | 7/1999 | Raab |
| 5,956,857 A | 9/1999 | Raab |
| 5,973,788 A | 10/1999 | Pettersen et al. |
| 5,978,748 A | 11/1999 | Raab |
| 5,983,936 A | 11/1999 | Schwieterman et al. |
| 5,996,790 A | 12/1999 | Yamada et al. |
| 5,997,779 A | 12/1999 | Potter |
| D423,534 S | 4/2000 | Raab et al. |
| 6,050,615 A | 4/2000 | Weinhold |
| 6,060,889 A | 5/2000 | Hocker |
| 6,067,116 A | 5/2000 | Yamano et al. |
| 6,125,337 A | 9/2000 | Rosenberg et al. |
| 6,131,299 A | 10/2000 | Raab et al. |
| 6,151,789 A | 11/2000 | Raab et al. |
| 6,163,294 A | 12/2000 | Talbot |
| 6,166,504 A | 12/2000 | Iida et al. |
| 6,166,809 A | 12/2000 | Pettersen et al. |
| 6,166,811 A | 12/2000 | Long et al. |
| 6,204,651 B1 | 3/2001 | Marcus et al. |
| 6,219,928 B1 | 4/2001 | Raab et al. |
| D441,632 S | 5/2001 | Raab et al. |
| 6,240,651 B1 | 6/2001 | Schroeder et al. |
| 6,253,458 B1 | 7/2001 | Raab et al. |
| 6,282,195 B1 | 8/2001 | Miller et al. |
| 6,298,569 B1 | 10/2001 | Raab et al. |
| 6,339,410 B1 | 1/2002 | Milner et al. |
| 6,366,831 B1 | 4/2002 | Raab |
| 6,418,774 B1 | 7/2002 | Brogaardh et al. |
| 6,438,856 B1 | 8/2002 | Kaczynski |
| 6,442,419 B1 | 8/2002 | Chu et al. |
| 6,470,584 B1 | 10/2002 | Stoodley |
| 6,477,784 B2 | 11/2002 | Schroeder et al. |
| 6,519,860 B1 | 2/2003 | Bieg et al. |
| D472,824 S | 4/2003 | Raab et al. |
| 6,547,397 B1 | 4/2003 | Kaufman et al. |
| 6,598,306 B2 | 7/2003 | Eaton |
| 6,611,346 B2 | 8/2003 | Granger |
| 6,611,617 B1 | 8/2003 | Crampton |
| 6,612,044 B2 | 9/2003 | Raab et al. |
| 6,621,065 B1 | 9/2003 | Fukumoto et al. |
| 6,626,339 B2 | 9/2003 | Gates et al. |
| 6,633,051 B1 | 10/2003 | Holloway et al. |
| 6,668,466 B1 | 12/2003 | Bieg et al. |
| D491,210 S | 6/2004 | Raab et al. |
| 6,764,185 B1 | 7/2004 | Beardsley et al. |
| 6,789,327 B2 | 9/2004 | Roth et al. |
| 6,820,346 B2 | 11/2004 | Raab et al. |
| 6,822,749 B1 | 11/2004 | Christoph |
| 6,826,664 B2 | 11/2004 | Hocker, III et al. |
| 6,868,359 B2 | 3/2005 | Raab |
| 6,879,933 B2 | 4/2005 | Steffey et al. |
| 6,892,465 B2 | 5/2005 | Raab et al. |
| 6,895,347 B2 | 5/2005 | Dorny et al. |
| 6,901,673 B1 | 6/2005 | Cobb et al. |
| 6,904,691 B2 | 6/2005 | Raab et al. |
| 6,920,697 B2 | 7/2005 | Raab et al. |
| 6,925,722 B2 | 8/2005 | Raab et al. |
| 6,931,745 B2 | 8/2005 | Granger |
| 6,935,748 B2 | 8/2005 | Kaufman et al. |
| 6,948,255 B2 | 9/2005 | Russell |
| 6,965,843 B2 | 11/2005 | Raab et al. |
| 7,003,892 B2 | 2/2006 | Eaton et al. |
| 7,006,084 B1 | 2/2006 | Buss et al. |
| 7,024,032 B2 | 4/2006 | Kidd et al. |
| 7,032,321 B2 | 4/2006 | Raab et al. |
| 7,040,136 B2 | 5/2006 | Forss et al. |
| 7,051,447 B2 | 5/2006 | Kikuchi et al. |
| 7,106,421 B2 | 9/2006 | Matsuura et al. |
| 7,117,107 B2 | 10/2006 | Dorny et al. |
| 7,120,092 B2 | 10/2006 | del Prado Pavon et al. |
| 7,152,456 B2 | 12/2006 | Eaton |
| 7,174,651 B2 | 2/2007 | Raab et al. |
| 7,184,047 B1 | 2/2007 | Crampton |
| 7,191,541 B1 | 3/2007 | Weekers et al. |
| 7,193,690 B2 | 3/2007 | Ossig et al. |
| 7,196,509 B2 | 3/2007 | Teng |
| 7,199,872 B2 | 4/2007 | Van Cranenbroeck |
| 7,230,689 B2 | 6/2007 | Lau |
| 7,242,590 B1 | 7/2007 | Yeap et al. |
| 7,249,421 B2 | 7/2007 | MacManus et al. |
| 7,269,910 B2 | 9/2007 | Raab et al. |
| 7,285,793 B2 | 10/2007 | Husted |
| 7,296,979 B2 | 11/2007 | Raab et al. |
| 7,306,339 B2 | 12/2007 | Kaufman et al. |
| 7,312,862 B2 | 12/2007 | Zumbrunn et al. |
| 7,313,264 B2 | 12/2007 | Crampton |
| 7,319,512 B2 | 1/2008 | Ohtomo et al. |
| 7,337,344 B2 | 2/2008 | Barman et al. |
| 7,348,822 B2 | 3/2008 | Baer |
| 7,352,446 B2 | 4/2008 | Bridges et al. |
| 7,360,648 B1 | 4/2008 | Blaschke |
| 7,372,558 B2 | 5/2008 | Kaufman et al. |
| 7,372,581 B2 | 5/2008 | Raab et al. |
| 7,383,638 B2 | 6/2008 | Granger |
| 7,388,654 B2 | 6/2008 | Raab et al. |

(56) References Cited

U.S. PATENT DOCUMENTS

| | | |
|---|---|---|
| 7,389,870 B2 | 6/2008 | Slappay |
| 7,395,606 B2 | 7/2008 | Crampton |
| 7,430,068 B2 | 9/2008 | Becker et al. |
| 7,447,931 B1 | 11/2008 | Rischar et al. |
| 7,449,876 B2 | 11/2008 | Pleasant et al. |
| 7,454,265 B2 | 11/2008 | Marsh |
| 7,463,368 B2 | 12/2008 | Morden et al. |
| 7,508,971 B2 | 3/2009 | Vaccaro et al. |
| 7,525,276 B2 | 4/2009 | Eaton |
| 7,545,517 B2 | 6/2009 | Rueb et al. |
| 7,546,689 B2 | 6/2009 | Ferrari et al. |
| 7,552,644 B2 | 6/2009 | Haase et al. |
| 7,561,598 B2 | 7/2009 | Stratton et al. |
| 7,564,250 B2 | 7/2009 | Hocker |
| 7,578,069 B2 | 8/2009 | Eaton |
| D599,226 S | 9/2009 | Gerent et al. |
| 7,589,595 B2 | 9/2009 | Cutler |
| 7,591,077 B2 | 9/2009 | Pettersson |
| 7,591,078 B2 | 9/2009 | Crampton |
| 7,602,873 B2 | 10/2009 | Eidson |
| 7,604,207 B2 | 10/2009 | Hasloecher et al. |
| 7,610,175 B2 | 10/2009 | Eidson |
| 7,614,157 B2 | 11/2009 | Granger |
| 7,624,510 B2 | 12/2009 | Ferrari |
| D607,350 S | 1/2010 | Cooduvalli et al. |
| 7,656,751 B2 | 2/2010 | Rischar et al. |
| 7,693,325 B2 | 4/2010 | Pulla et al. |
| 7,701,592 B2 | 4/2010 | Saint Clair et al. |
| 7,712,224 B2 | 5/2010 | Hicks |
| 7,721,396 B2 | 5/2010 | Fleischman |
| 7,735,234 B2 | 6/2010 | Briggs et al. |
| 7,743,524 B2 | 6/2010 | Eaton et al. |
| 7,752,003 B2 | 7/2010 | MacManus |
| 7,765,707 B2 | 8/2010 | Tomelleri |
| 7,769,559 B2 | 8/2010 | Reichert |
| 7,774,949 B2 | 8/2010 | Ferrari |
| 7,779,548 B2 | 8/2010 | Ferrari |
| 7,779,553 B2 | 8/2010 | Jordil et al. |
| 7,800,758 B1 | 9/2010 | Bridges et al. |
| 7,804,602 B2 | 9/2010 | Raab |
| 7,805,851 B2 | 10/2010 | Pettersson |
| 7,805,854 B2 | 10/2010 | Eaton |
| 7,809,518 B2 | 10/2010 | Zhu et al. |
| RE42,055 E | 1/2011 | Raab et al. |
| RE42,082 E | 2/2011 | Raab et al. |
| 7,881,896 B2 | 2/2011 | Atwell et al. |
| 7,903,261 B2 | 3/2011 | Saint Clair et al. |
| 7,908,757 B2 | 3/2011 | Ferrari |
| 8,052,857 B2 | 11/2011 | Townsend |
| 8,065,861 B2 | 11/2011 | Caputo |
| 8,082,673 B2 | 12/2011 | Desforges et al. |
| 8,099,877 B2 | 1/2012 | Champ |
| 8,123,350 B2 | 2/2012 | Cannell et al. |
| 8,171,650 B2 * | 5/2012 | York et al. ................ 33/503 |
| 8,276,286 B2 * | 10/2012 | Bailey et al. .............. 33/503 |
| 8,284,407 B2 * | 10/2012 | Briggs et al. ............. 356/614 |
| 2001/0004269 A1 | 6/2001 | Shibata et al. |
| 2002/0032541 A1 | 3/2002 | Raab et al. |
| 2002/0087233 A1 | 7/2002 | Raab |
| 2002/0128790 A1 | 9/2002 | Woodmansee |
| 2002/0170192 A1 | 11/2002 | Steffey et al. |
| 2003/0033104 A1 | 2/2003 | Gooche |
| 2003/0053037 A1 | 3/2003 | Blaesing-Bangert et al. |
| 2003/0125901 A1 | 7/2003 | Steffey et al. |
| 2003/0142631 A1 | 7/2003 | Silvester |
| 2003/0167647 A1 | 9/2003 | Raab et al. |
| 2003/0172536 A1 | 9/2003 | Raab et al. |
| 2003/0172537 A1 | 9/2003 | Raab et al. |
| 2003/0208919 A1 | 11/2003 | Raab et al. |
| 2003/0221326 A1 | 12/2003 | Raab et al. |
| 2004/0040166 A1 | 3/2004 | Raab et al. |
| 2004/0103547 A1 | 6/2004 | Raab et al. |
| 2004/0111908 A1 | 6/2004 | Raab et al. |
| 2004/0139265 A1 | 7/2004 | Hocker, III et al. |
| 2004/0162700 A1 | 8/2004 | Rosenberg et al. |
| 2004/0259533 A1 | 12/2004 | Nixon et al. |
| 2005/0016008 A1 | 1/2005 | Raab et al. |
| 2005/0028393 A1 | 2/2005 | Raab et al. |
| 2005/0085940 A1 | 4/2005 | Griggs et al. |
| 2005/0144799 A1 | 7/2005 | Raab et al. |
| 2005/0151963 A1 | 7/2005 | Pulla et al. |
| 2005/0166413 A1 | 8/2005 | Crampton |
| 2005/0188557 A1 | 9/2005 | Raab et al. |
| 2005/0259271 A1 | 11/2005 | Christoph |
| 2005/0276466 A1 | 12/2005 | Vaccaro et al. |
| 2005/0283989 A1 | 12/2005 | Pettersson |
| 2006/0016086 A1 | 1/2006 | Raab et al. |
| 2006/0017720 A1 | 1/2006 | Li |
| 2006/0026851 A1 | 2/2006 | Raab et al. |
| 2006/0028203 A1 | 2/2006 | Kawashima et al. |
| 2006/0053647 A1 | 3/2006 | Raab et al. |
| 2006/0056459 A1 | 3/2006 | Stratton et al. |
| 2006/0056559 A1 | 3/2006 | Pleasant et al. |
| 2006/0059270 A1 | 3/2006 | Pleasant et al. |
| 2006/0096108 A1 | 5/2006 | Raab et al. |
| 2006/0123649 A1 | 6/2006 | Muller |
| 2006/0129349 A1 | 6/2006 | Raab et al. |
| 2006/0169050 A1 | 8/2006 | Kobayashi et al. |
| 2006/0169608 A1 | 8/2006 | Carnevali |
| 2006/0282574 A1 | 12/2006 | Zotov et al. |
| 2006/0287769 A1 | 12/2006 | Yanagita et al. |
| 2006/0291970 A1 | 12/2006 | Granger |
| 2007/0030841 A1 | 2/2007 | Lee et al. |
| 2007/0043526 A1 | 2/2007 | De Jonge et al. |
| 2007/0050774 A1 | 3/2007 | Eldson et al. |
| 2007/0055806 A1 | 3/2007 | Stratton et al. |
| 2007/0058162 A1 | 3/2007 | Granger |
| 2007/0097382 A1 | 5/2007 | Granger |
| 2007/0105238 A1 | 5/2007 | Mandl et al. |
| 2007/0142970 A1 | 6/2007 | Burbank et al. |
| 2007/0147265 A1 | 6/2007 | Eidson |
| 2007/0147435 A1 | 6/2007 | Hamilton et al. |
| 2007/0147562 A1 | 6/2007 | Eidson |
| 2007/0153297 A1 | 7/2007 | Lau |
| 2007/0163134 A1 | 7/2007 | Eaton |
| 2007/0176648 A1 | 8/2007 | Baer |
| 2007/0177016 A1 | 8/2007 | Wu |
| 2007/0183459 A1 | 8/2007 | Eidson |
| 2007/0185682 A1 | 8/2007 | Eidson |
| 2007/0217169 A1 | 9/2007 | Yeap et al. |
| 2007/0217170 A1 | 9/2007 | Yeap et al. |
| 2007/0221522 A1 | 9/2007 | Yamada et al. |
| 2007/0223477 A1 | 9/2007 | Eidson |
| 2007/0248122 A1 | 10/2007 | Hamilton |
| 2007/0256311 A1 | 11/2007 | Ferrari |
| 2007/0257660 A1 | 11/2007 | Pleasant et al. |
| 2007/0258378 A1 | 11/2007 | Hamilton |
| 2007/0282564 A1 | 12/2007 | Sprague et al. |
| 2007/0294045 A1 | 12/2007 | Atwell et al. |
| 2008/0046221 A1 | 2/2008 | Stathis |
| 2008/0052936 A1 | 3/2008 | Briggs et al. |
| 2008/0066583 A1 | 3/2008 | Lott |
| 2008/0068103 A1 | 3/2008 | Cutler |
| 2008/0080562 A1 | 4/2008 | Burch et al. |
| 2008/0096108 A1 | 4/2008 | Sumiyama et al. |
| 2008/0098272 A1 | 4/2008 | Fairbanks et al. |
| 2008/0148585 A1 | 6/2008 | Raab et al. |
| 2008/0154538 A1 | 6/2008 | Stathis |
| 2008/0179206 A1 | 7/2008 | Feinstein et al. |
| 2008/0183065 A1 | 7/2008 | Goldbach |
| 2008/0196260 A1 | 8/2008 | Pettersson |
| 2008/0204699 A1 | 8/2008 | Benz et al. |
| 2008/0216552 A1 | 9/2008 | Ibach et al. |
| 2008/0228331 A1 | 9/2008 | McNerney et al. |
| 2008/0232269 A1 | 9/2008 | Tatman et al. |
| 2008/0235969 A1 | 10/2008 | Jordil et al. |
| 2008/0235970 A1 | 10/2008 | Crampton |
| 2008/0240321 A1 | 10/2008 | Narus et al. |
| 2008/0245452 A1 | 10/2008 | Law et al. |
| 2008/0246943 A1 | 10/2008 | Kaufman et al. |
| 2008/0252671 A1 | 10/2008 | Cannell et al. |
| 2008/0256814 A1 | 10/2008 | Pettersson |
| 2008/0257023 A1 | 10/2008 | Jordil et al. |
| 2008/0263411 A1 | 10/2008 | Baney et al. |

(56) References Cited

U.S. PATENT DOCUMENTS

| | | |
|---|---|---|
| 2008/0271332 A1 | 11/2008 | Jordil et al. |
| 2008/0282564 A1 | 11/2008 | Pettersson |
| 2008/0295349 A1 | 12/2008 | Uhl et al. |
| 2008/0298254 A1 | 12/2008 | Eidson |
| 2008/0309460 A1 | 12/2008 | Jefferson et al. |
| 2009/0000136 A1 | 1/2009 | Crampton |
| 2009/0016475 A1 | 1/2009 | Rischar et al. |
| 2009/0031575 A1 | 2/2009 | Tomelleri |
| 2009/0046140 A1 | 2/2009 | Lashmet et al. |
| 2009/0046895 A1 | 2/2009 | Pettersson et al. |
| 2009/0049704 A1 | 2/2009 | Styles et al. |
| 2009/0083985 A1 | 4/2009 | Ferrari |
| 2009/0089004 A1 | 4/2009 | Vook et al. |
| 2009/0089078 A1 | 4/2009 | Bursey |
| 2009/0089233 A1 | 4/2009 | Gach et al. |
| 2009/0089623 A1 | 4/2009 | Neering et al. |
| 2009/0109797 A1 | 4/2009 | Eidson |
| 2009/0113183 A1 | 4/2009 | Barford et al. |
| 2009/0113229 A1 | 4/2009 | Cataldo et al. |
| 2009/0122805 A1 | 5/2009 | Epps et al. |
| 2009/0125196 A1 | 5/2009 | Velazquez et al. |
| 2009/0139105 A1 | 6/2009 | Granger |
| 2009/0157419 A1 | 6/2009 | Bursey |
| 2009/0165317 A1 | 7/2009 | Little |
| 2009/0177435 A1 | 7/2009 | Heininen |
| 2009/0177438 A1 | 7/2009 | Raab |
| 2009/0187373 A1 | 7/2009 | Atwell et al. |
| 2009/0241360 A1 | 10/2009 | Tait et al. |
| 2009/0249634 A1 | 10/2009 | Pettersson |
| 2009/0265946 A1 | 10/2009 | Jordil et al. |
| 2010/0040742 A1 | 2/2010 | Dijkhuis et al. |
| 2010/0057392 A1 | 3/2010 | York |
| 2010/0078866 A1 | 4/2010 | Pettersson |
| 2010/0095542 A1 | 4/2010 | Ferrari |
| 2010/0122920 A1 | 5/2010 | Butter et al. |
| 2010/0123892 A1 | 5/2010 | Miller et al. |
| 2010/0128259 A1 | 5/2010 | Bridges et al. |
| 2010/0134596 A1 | 6/2010 | Becker |
| 2010/0148013 A1 | 6/2010 | Bhotika et al. |
| 2010/0208062 A1 | 8/2010 | Pettersson |
| 2010/0277747 A1 | 11/2010 | Rueb et al. |
| 2010/0281705 A1 | 11/2010 | Verdi et al. |
| 2010/0286941 A1 | 11/2010 | Merlot |
| 2010/0312524 A1 | 12/2010 | Siercks et al. |
| 2010/0318319 A1 | 12/2010 | Maierhofer |
| 2010/0325907 A1 | 12/2010 | Tait |
| 2011/0007305 A1 | 1/2011 | Bridges et al. |
| 2011/0007326 A1 | 1/2011 | Daxauer et al. |
| 2011/0013199 A1 | 1/2011 | Siercks et al. |
| 2011/0019155 A1 | 1/2011 | Daniel et al. |
| 2011/0023578 A1 | 2/2011 | Grasser |
| 2011/0043515 A1 | 2/2011 | Stathis |
| 2011/0094908 A1 | 4/2011 | Trieu |
| 2011/0107611 A1 | 5/2011 | Desforges et al. |
| 2011/0107612 A1 | 5/2011 | Ferrari et al. |
| 2011/0107613 A1 | 5/2011 | Tait |
| 2011/0107614 A1 | 5/2011 | Champ |
| 2011/0111849 A1 | 5/2011 | Sprague et al. |
| 2011/0112786 A1 | 5/2011 | Desforges et al. |
| 2011/0164114 A1 | 7/2011 | Kobayashi et al. |
| 2011/0173827 A1 | 7/2011 | Bailey et al. |
| 2011/0173828 A1 | 7/2011 | York |
| 2011/0178755 A1 | 7/2011 | York |
| 2011/0178762 A1 | 7/2011 | York |
| 2011/0178764 A1 | 7/2011 | York |
| 2011/0178765 A1 | 7/2011 | Atwell et al. |
| 2011/0192043 A1 | 8/2011 | Ferrari |
| 2011/0273568 A1 | 11/2011 | Lagassey |
| 2012/0181194 A1 | 7/2012 | McEwan et al. |
| 2012/0210678 A1 | 8/2012 | Alcouloumre et al. |
| 2012/0260611 A1 | 10/2012 | Jones |
| 2013/0025143 A1* | 1/2013 | Bailey et al. ............... 33/503 |
| 2013/0025144 A1* | 1/2013 | Briggs et al. ............... 33/503 |
| 2013/0062243 A1 | 3/2013 | Chang et al. |
| 2013/0097882 A1* | 4/2013 | Bridges et al. ............. 33/503 |
| 2013/0125408 A1* | 5/2013 | Atwell et al. ............... 33/503 |

FOREIGN PATENT DOCUMENTS

| | | |
|---|---|---|
| CN | 2665668 | 12/2004 |
| CN | 1818537 | 8/2006 |
| CN | 201266071 | 7/2009 |
| DE | 3245060 A1 | 7/1983 |
| DE | 4410775 A1 | 10/1995 |
| DE | 29622033 | 2/1997 |
| DE | 19543763 A1 | 5/1997 |
| DE | 19820307 A1 | 11/1999 |
| DE | 10026357 | 1/2002 |
| DE | 202005000983 U1 | 4/2005 |
| DE | 102004015668 B3 | 9/2005 |
| DE | 19720049 B4 | 1/2006 |
| DE | 10114126 B4 | 8/2006 |
| DE | 102004010083 B4 | 11/2006 |
| DE | 102005060967 A1 | 6/2007 |
| DE | 102006023902 | 11/2007 |
| DE | 102006035292 | 1/2008 |
| DE | 102008039838 | 3/2010 |
| DE | 102005036929 B4 | 6/2010 |
| DE | 102008062763 B3 | 7/2010 |
| DE | 102009001894 | 9/2010 |
| EP | 0546784 A2 | 6/1993 |
| EP | 0730210 | 9/1996 |
| EP | 0614517 | 3/1997 |
| EP | 1160539 | 12/2001 |
| EP | 1189124 | 3/2002 |
| EP | 1189124 A1 | 3/2002 |
| EP | 0767357 B1 | 5/2002 |
| EP | 1361414 A1 | 11/2003 |
| EP | 1468791 A1 | 10/2004 |
| EP | 1669713 A1 | 6/2006 |
| EP | 1734425 | 12/2006 |
| EP | 1429109 | 4/2007 |
| EP | 1764579 | 12/2007 |
| EP | 1878543 | 1/2008 |
| EP | 1967930 | 9/2008 |
| EP | 2023077 A1 | 2/2009 |
| EP | 2060530 A1 | 5/2009 |
| EP | 2068067 A1 | 6/2009 |
| EP | 2108917 A1 | 10/2009 |
| EP | 2400261 | 12/2011 |
| FR | 2935043 A1 | 2/2010 |
| GB | 894320 | 4/1962 |
| GB | 2255648 A | 11/1992 |
| GB | 2341203 A | 3/2000 |
| GB | 2420241 A | 5/2006 |
| GB | 2452033 | 2/2009 |
| JP | 5581525 | 6/1955 |
| JP | 5827264 | 2/1983 |
| JP | 6313710 A | 8/1994 |
| JP | 7210586 A | 8/1995 |
| JP | 2003194526 | 7/2003 |
| JP | 2004257927 A | 9/2004 |
| JP | 2005517908 | 6/2005 |
| JP | 2006241833 | 9/2006 |
| JP | 2006301991 A | 11/2006 |
| JP | 2009524057 | 6/2009 |
| WO | 9208568 A1 | 5/1992 |
| WO | 9808050 | 2/1998 |
| WO | 9910706 A1 | 3/1999 |
| WO | 0014474 | 3/2000 |
| WO | 0033149 | 6/2000 |
| WO | 0034733 | 6/2000 |
| WO | 02101323 A2 | 12/2002 |
| WO | 2004096502 A1 | 11/2004 |
| WO | 2005072917 | 8/2005 |
| WO | 2005075875 | 8/2005 |
| WO | 2005100908 A1 | 10/2005 |
| WO | 2006051264 A1 | 5/2006 |
| WO | 2007002319 A1 | 1/2007 |
| WO | 2007028941 A1 | 3/2007 |
| WO | 2007125081 A1 | 11/2007 |
| WO | 2007144906 A1 | 12/2007 |

(56) References Cited

FOREIGN PATENT DOCUMENTS

| | | |
|---|---|---|
| WO | 2008027588 | 3/2008 |
| WO | 2008047171 A1 | 4/2008 |
| WO | WO 2008/047171 | 4/2008 |
| WO | 2008064276 A3 | 5/2008 |
| WO | 2008066896 | 6/2008 |
| WO | 2008075170 A1 | 6/2008 |
| WO | 2008157061 A1 | 12/2008 |
| WO | 2009001165 A1 | 12/2008 |
| WO | 2009016185 A1 | 2/2009 |
| WO | 2009083452 A1 | 7/2009 |
| WO | 2009127526 A1 | 10/2009 |
| WO | 2009130169 A1 | 10/2009 |
| WO | 2009149740 A1 | 12/2009 |
| WO | 2010040742 A1 | 4/2010 |
| WO | 2010092131 A1 | 8/2010 |
| WO | 2010108089 A2 | 9/2010 |
| WO | 2010148525 A1 | 12/2010 |
| WO | 2011000435 A1 | 1/2011 |
| WO | 2011000955 A1 | 1/2011 |
| WO | 2011/057130 A2 | 5/2011 |
| WO | 2011057130 A2 | 5/2011 |
| WO | 2012038446 A1 | 3/2012 |

OTHER PUBLICATIONS

Japanese Office Action and English Language summary for JP2012-550044 filed Jul. 20, 2012; based on International Application No. PCT/US2011/021252 filed Jan. 14, 2011.
Japanese Office Action and English Language summary for JP2012-550043 filed Jul. 20, 2012; based on International Application No. PCT/US2011/021250 filed Jan. 14, 2011.
Dylan, Craig R., High Precision Makes the Massive Bay Bridge Project Work. Suspended in MidAir—Cover Story—Point of Beginning, Jan. 1, 2010, [online] http://www.pobonline.com/Articles/Cover_Story/BNP_GUID_9-5-2006_A_10000000000 . . . [Retreived Jan. 25, 2010].
Franklin, Paul F., What IEEE 1588 Means for Your Next T&M System Design, Keithley Instruments, Inc., [on-line] Oct. 19, 2010, http://www.eetimes.com/General/DisplayPrintViewContent?contentItemId=4209746, [Retreived Oct. 21, 2010].
HYDROpro Navigation, Hydropgraphic Survey Software, Trimble, www.trimble.com, Copyright 1997-2003.
Trimble—Trimble SPS630, SPS730 and SPS930 Universal Total Stations, [on-line] http://www.trimble.com/sps630_730_930.shtml (1 of 4), [Retrieved Jan. 26, 2010 8:50:29AM].
Written Opinion of the International Searching Authority for International Application No. PCT/US2011/021270 mailed May 2, 2011.
Written Opinion of the International Searching Authority for International Application No. PCT/US2011/021274 mailed May 6, 2011.
Written Opinion of the International Searching Authority for International Application No. PCT/US2011/021276 filed Jan. 14, 2011.
Written Opinion of the International Searching Authority for International Application No. PCT/US2011/021278 mailed May 25, 2011.
Written Opinion of the International Searching Authority for International Application No. PCT/US2011/021794 mailed Sep. 23, 2011.
Written Opinion of the International Searching Authority for International Application No. PCT/US2011/021253 mailed Mar. 22, 2012.
Laser Reverse Engineering with Microscribe, [online], [retrieved Nov. 29, 2011], http://www.youtube.com/watch?v=8VRz_2aEJ4E&feature=PlayList&p=F63ABF74F30DC81B&playnext=1&playnext_from=PL&index=1.
Examination Report for German Application No. 11 2011 100 193.2 Report dated Dec. 20, 2012; based on PCT/US2011/021249.
Faro Product Catalog; Faro Arm; 68 pages; Faro Technologies Inc. 2009; printed Aug. 3, 2009.
Romer Measuring Arms; Portable CMMs for the shop floor; 20 pages; Hexagon Metrology, Inc. (2009) http//us.ROMER.com.
German Patent Application No. 11 2011 100 291.2 dated Dec. 20, 2012. All art cited within.
German Office Action and English Language summary for DE 112011100292.0 filed Jul. 3, 2012, based on PCT Application US2011/021252 filed Jan. 14, 2011.
A. Hart; "Kinematic Coupling Interchangibility" Precision Engineering; vol. 28, No. 1; Jan. 1, 2004 pp. 1-15.
ABB Flexibile Automation AB: "Product Manual IRB 6400R M99, On-line Manual"; Sep. 13, 2006; XP00002657684; Retrieved from the Internet: URL: http://pergatory.mit.edu/kinematiccouplings/case_studies/ABB_Robotics/general/6400R%20Product%20Manual.pdf (retrieved Aug. 26, 2011).
Anonymous: So wird's gemacht: Mit T-DSL and Windows XP Home Edition gemeinsam ins Internet (Teil 3) Internet Citation, Jul. 2003, XP002364586, Retrieved from Internet: URL:http://support.microsfot.com/kb/814538/DE/ [retrieved on Jan. 26, 2006]eh whole document.
GoMeasure3D—Your source for all things measurement, Baces 3D 100 Series Portable CMM from GoMeasure3D, [online], [retrieved Nov. 29, 2011], http://www.gomeasure3d.com/baces100.html.
Cho, et al., Implementation of a Precision Time Protocol over Low Rate Wireless Personal Area Networks, IEEE, 2008.
Cooklev, et al., An Implementation of IEEE 1588 Over IEEE 802.11b for Syncrhonization of Wireless Local Area Network Nodes, IEEE Transactions on Instrumentation and Measurement, vol. 56, No. 5, Oct. 2007.
Information on Electro-Optical Information Systems; EOIS 3D Mini-Moire C.M.M. Sensor for Non-Contact Measuring & Surface Mapping; Direct Dimensions, Jun. 1995.
It is Alive in the Lab, Autodesk University, Fun with the Immersion MicroScribe Laser Scanner, [online], [retrieved Nov. 29, 2011], http://labs.blogs.com/its_alive_in_the_lab/2007/11/fun-with-the-im.html.
Ghost 3D Systems, Authorized MicroScribe Solutions, FAQs—MicroScribe 3D Laser, MicroScan Tools, & related info, [online], [retrieved Nov. 29, 2011], http://microscribe.ghost3d.com/gt_microscan-3d_faqs.htm,.
Electro-Optical Information Systems, "The Handy Handheld Digitizer" [online], [retrieved on Nov. 29, 2011], http://vidibotics.com/htm/handy.htm.
International Search Report for International Application No. PCT/2011/020625 mailed Feb. 25, 2011.
International Search Report for International Application No. PCT/US2011/021270 mailed May 2, 2011.
International Search Report for International Application No. PCT/US2011/021274 mailed May 6, 2011.
International Search Report for International Application No. PCT2011/021276 filed Jan. 14, 2011.
International Search Report for International Application No. PCT/US2011/021246 mailed Apr. 12, 2011.
International Search Report for International Application No. PCT/US2011/021248 mailed Sep. 19, 2011.
International Search Report for International Application No. PCT/US2011/021249 mailed Apr. 21, 2011.
Internation Search Report for International Application No. PCT/US2011/021250 mailed Apr. 18, 2011.
International Search Report for International Application No. PCT/US2011/021252 mailed Apr. 27, 2011.
International Search Report for International Application No. PCT/US2011/021253 mailed Sep. 26, 2011.
International Search Report for International Application No. PCT/US2011/021259 mailed May 25, 2011.
International Search Report for International Application No. PCT/US2011/021262 mailed May 11, 2011.
International Search Report for International Application No. PCT/US2011/021263 mailed May 4, 2011.
International Search Report for International Application No. PCT/US2011/021264 mailed May 31, 2011.
PCT/US2011/021270—International Search Report mailed May 2, 2011.
International Search Report for International Application No. PCT/US2011/021272 mailed Apr. 7, 2011.

(56) References Cited

OTHER PUBLICATIONS

International Search Report and Written Opinion for International Application No. PCT/US2011/021273 filed Jan. 14, 2011.
International Search Report for International Application No. PCT/US2011/021278 mailed May 25, 2011.
International Search Report for International Application No. PCT/US2011/021794 mailed Sep. 23, 2011.
Jasperneite, et al., Enhancements to the Time Synchronization Standard IEEE-1588 for a System of Cascaded Bridges, IEEE, 2004.
Kreon Laser Scanners, Getting the Best in Cutting Edge 3D Digitizing Technology, B3-D MCAD Consulting/Sales [online], [retrieved Nov. 29, 2011], http://www.b3-d.com/Kreon.html.
MicroScan 3D User Guide, RSI GmbH, 3D Systems & Software, Oberursel, Germany, email: info@rsi-gmbh.de, Copyright RSI Roland Seifert Imaging GmbH 2008.
Patrick Willoughby; "Elastically Averaged Precision Alignment"; In: "Doctoral Thesis"; Jun. 1, 2005; Massachusetts Institute of Technology; XP55005620; Abstract 1.1 Motivation; Chapter 3, Chapter 6.
PCT/2011/020625 International Search Report—dated Feb. 25, 2011.
Sauter, et al., Towards New Hybrid Networks for Industrial Automation, IEEE, 2009.
Spada, et al., IEEE 1588 Lowers Integration Costs in Continuous Flow Automated Production Lines, XP-002498255, ARC Insights, Insight # 2003-33MD&H, Aug. 20, 2003.
Written Opinion for PCT/2011/020625 dated Feb. 25, 2011.
Written Opinion of the International Searching Authority for International Application No. PCT/US2011/020625 mailed Feb. 25, 2011.
Written Opinion of the International Searching Authority for International Application No. PCT/US2011/021246 mailed Apr. 12, 2011.
Written Opinion of the International Searching Authority for International Application No. PCT/US2011/021248 mailed Sep. 19, 2011.
Written Opinion of the International Searching Authority for International Application No. PCT/US2011/021249 mailed Apr. 21, 2011.
Written Opinion of the International Searching Authority for International Application No. PCT/US2011/021250 mailed Apr. 18, 2011.
Written Opinion of the International Searching Authority for International Application No. PCT/US2011/021252 mailed Apr. 27, 2011.
Written Opinion of the International Searching Authority for International Application No. PCT/US2011/021253 mailed Sep. 26, 2011.
Written Opinion of the International Searching Authority for International Application No. PCT/US2011/021259 mailed May 25, 2011.
Written Opinion of the International Searching Authority for International Application No. PCT/US2011/021262 mailed May 11, 2011.
Written Opinion of the International Searching Authority for International Application No. PCT/US2011/021263 mailed May 4, 2011.
Written Opinion of the International Searching Authority for International Application No. PCT/US2011/021264 mailed May 31, 2011.
International Preliminary Report on Patentability mailed May 9, 2012 for International Application Serial No. PCT/US2011/021253 International filing date Jan. 14, 2011. Date of Completion May 9, 2012.
International Preliminary Report on Patentability for PCT/US2011/021274; Date of Completion Apr. 12, 2012.
International Search Report and Written Opinion for International Application No. PCT/US2011/021273 filed Apr. 20, 2011.
International Serach Report for International Application No. PCT/US2011/050787; Mailing date Mar. 11, 2011.
Romer "Romer Absolute Arm Maximum Performance Portable Measurement" (Printed Oct. 2010); Hexagon Metrology, Inc. htt://us:ROMER.com; Hexagon Metrology, Inc., 2010.
Romer Romer Absolute Arm Product Brochure: (2010); Hexagon Metrology; www.hexagonmetrology.com; Hexagon AB, 2010.
Written Opinion of the International Searching Authority for International Application No. PCT/US2011/050787 mailed Mar. 11, 2011.
Examination Report under Section 18(3); Report dated Oct. 31, 2012; Application No. GB1210309.9.
Examination Report under Section 18(3); Report dated Nov. 1, 2012; Application No. GB1210311.5.
Examination Report under Section 18(3); Report dated Nov. 6, 2012; Application No. GB1210306.5.
International Search Report of the International Searching Authority for Application No. PCT/US2013/022186; Date of Mailing: May 29, 2013.
Written Opinion of the International Searching Authority for Application No. PCT/US2013/022186; Date of Mailing: May 29, 2013.
International Preliminary Report on Patentability for International Application Serial No. PCT/US2011/021246 International filing date Jan. 14, 2011. Date of Issuance Jul. 24, 2012.
International Preliminary Report on Patentability for International Application Serial No. PCT/US2011/021249 International filing date Jan. 14, 2011. Date of Issuance Jul. 24, 2012.
International Preliminary Report on Patentability for International Application Serial No. PCT/US2011/021250 International filing date Jan. 14, 2011. Date of Issuance Jul. 24, 2012.
International Preliminary Report on Patentability for International Application Serial No. PCT/US2011/021252 International filing date Jan. 14, 2011. Date of Issuance Jul. 24, 2012.
International Preliminary Report on Patentability for International Application Serial No. PCT/US2011/021247 International filing date Jan. 14, 2011. Date of Issuance Jul. 24, 2012.
International Preliminary Report on Patentability for International Application Serial No. PCT/US2011/021259. International filing date Jan. 14, 2011. Date of Issuance Jul. 24, 2012.
International Preliminary Report on Patentability for International Application Serial No. PCT/US2011/021262. International filing date Jan. 14, 2011. Date of Issuance Jul. 24, 2012.
International Preliminary Report on Patentability for International Application Serial No. PCT/US2011/021263. International filing date Jan. 14, 2011. Date of Issuance Jul. 24, 2012.
International Preliminary Report on Patentability for International Application Serial No. PCT/US2011/021264. International filing date Jan. 14, 2011. Date of Issuance Jul. 24, 2012.
International Preliminary Report on Patentability for International Application Serial No. PCT/US2011/021270. International filing date Jan. 14, 2011. Date of Issuance Jul. 24, 2012.
International Preliminary Report on Patentability for International Application Serial No. PCT/US2011/021272. International filing date Jan. 14, 2011. Date of Issuance Jul. 24, 2012.
International Preliminary Report on Patentability for International Application Serial No. PCT/US2011/021273. International filing date Jan. 14, 2011. Date of Issuance Jul. 24, 2012.
International Preliminary Report on Patentability for International Application Serial No. PCT/US2011/021276. International filing date Jan. 14, 2011. Date of Issuance Jul. 24, 2012.
International Preliminary Report on Patentability for International Application Serial No. PCT/US2011/021278. International filing date Jan. 14, 2011. Date of Issuance Jul. 24, 2012.
International Preliminary Report on Patentability for International Application Serial No. PCT/US2011/021794. International filing date Jan. 20, 2011. Date of Issuance Jul. 24, 2012.
International Preliminary Report on Patentability for PCT/US2011/020625; Date of Issuance Jul. 17, 2012.
International Search Report for International Application No. PCT/US2011/021247 mailed Aug. 26, 2011.
Written Opinion of the International Searching Authority for International Application No. PCT/US2011/021247 mailed Aug. 26, 2011.
JGENG "DLP-Based Structured Light 3D Imaging Technologies and Applications" (15 pages) Emerging Digital Micromirror Device Based Systems and Application III; edited by Michael R. Douglass, Patrick I. Oden, Proc. of SPIE, vol. 7932, 79320B; (2011) SPIE.

(56) References Cited

OTHER PUBLICATIONS

International Search Report for International Application No. PCT/US/2013/041826 filed May 20, 2013; mailed Jul. 29, 2013.
Written Opinion for International Application No. PCT/US/2013/041826 filed May 20, 2013; mailed Jul. 29, 2013.
Examination Report for German Application No. 11 2011 100 290.4 Report dated Jul. 16, 2013; based on PCT/US2011/021247.
Romer "Romer Measuring Arms Portable CMMs for R&D and shop floor" (Mar. 2009) Hexagon Metrology (16 pages).
MG Lee; "Compact 3D LIDAR based on optically coupled horizontal and vertical Scanning mechanism for the autonomous navigation of robots" (13 pages) vol. 8037; downloaded from http://proceedings.spiedigitallibrary.org/ on Jul. 2, 2013.
P Ben-Tzvi, et al "Extraction of 3D Images Using Pitch-Actuated 2D Laser Range Finder for Robotic Vision" (6 pages) BNSDOCID <XP 31840390A_1_>.
International Search Report for International Application No. PCT/US2013/040321 mailed Jul. 15, 2013.
YK Cho, et al. "Light-weight 3D LADAR System for Construction Robotic Operations" (pp. 237-244); 26th International Symposium on Automation and Robotics in Construction (ISARC 2009).
Written Opinion for International Application No. PCT/US2013/040321 mailed Jul. 15, 2013.
International Search Report for International Application No. PCT/US2013/040309 mailed Jul. 15, 2013.
Written Opinion for International Application No. PCT/US2013/040309 mailed Jul. 15, 2013.

* cited by examiner

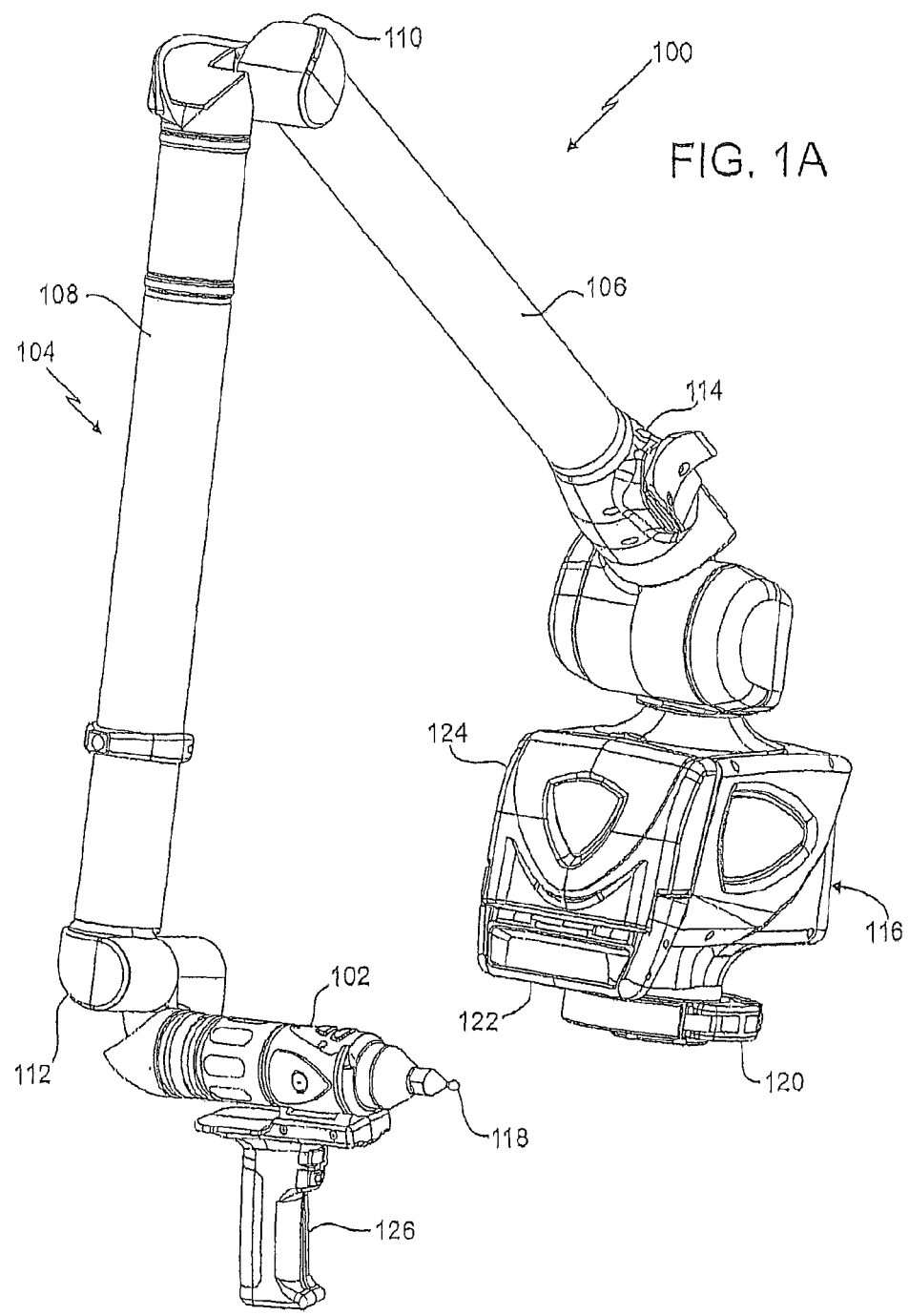

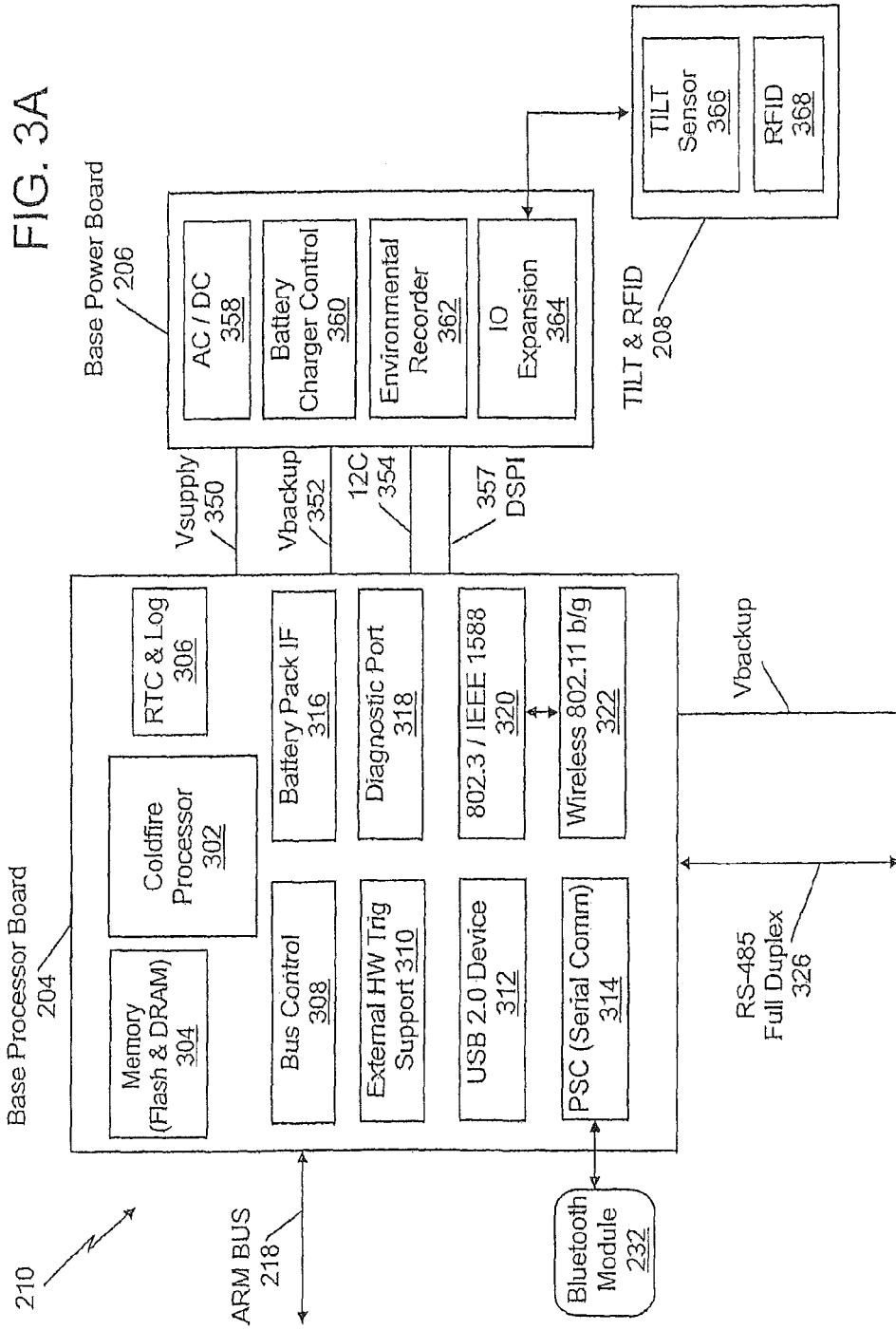

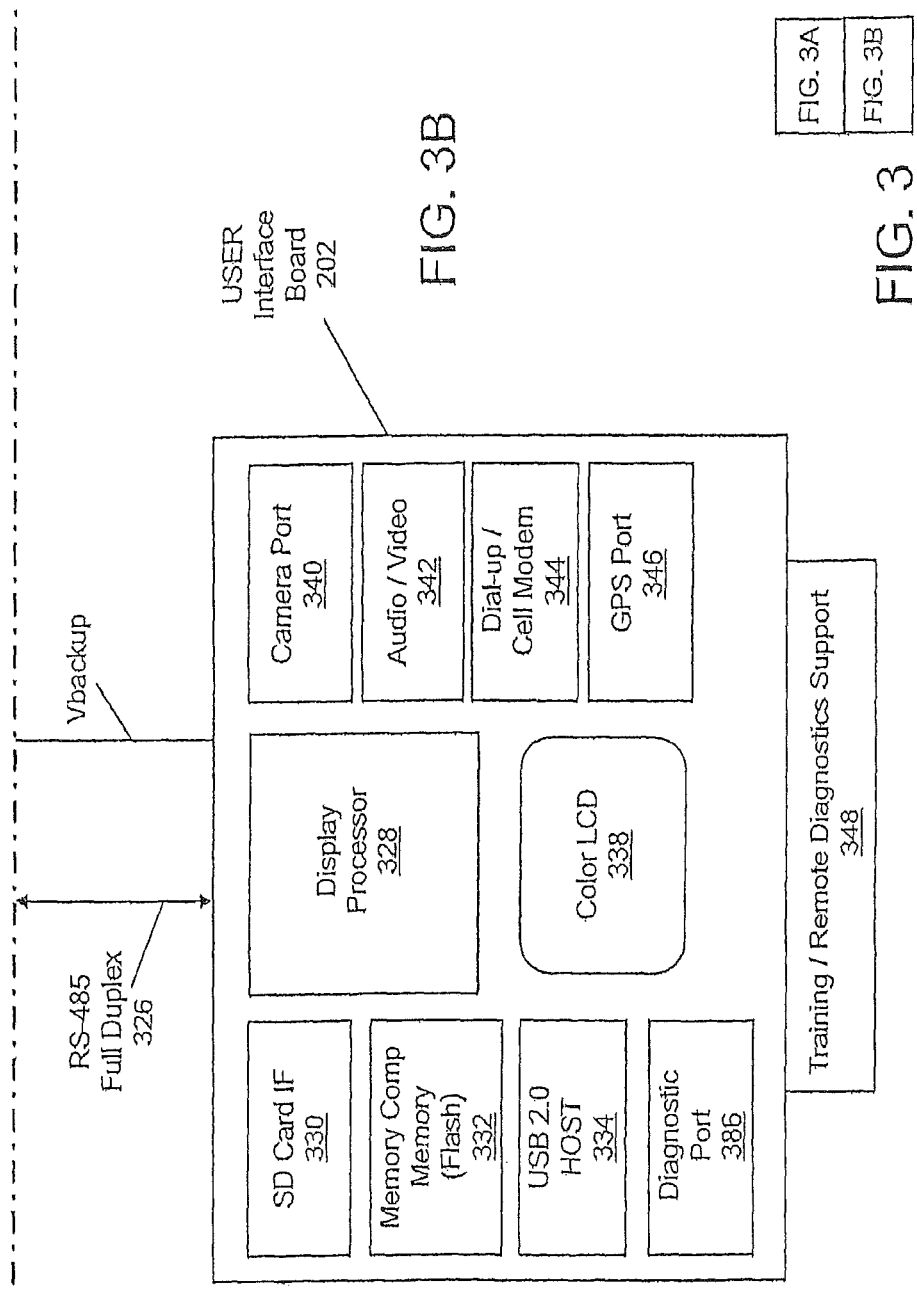

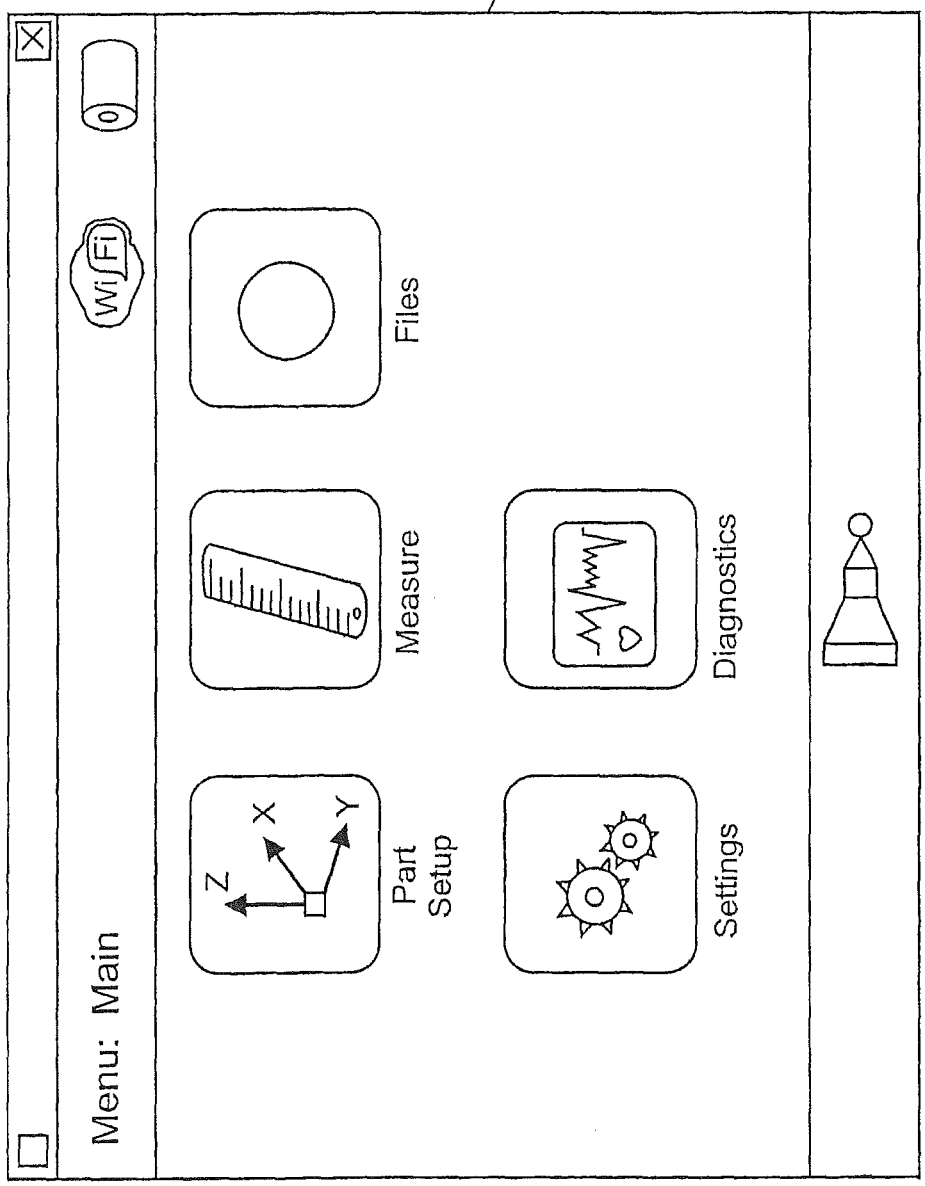

FIG. 9

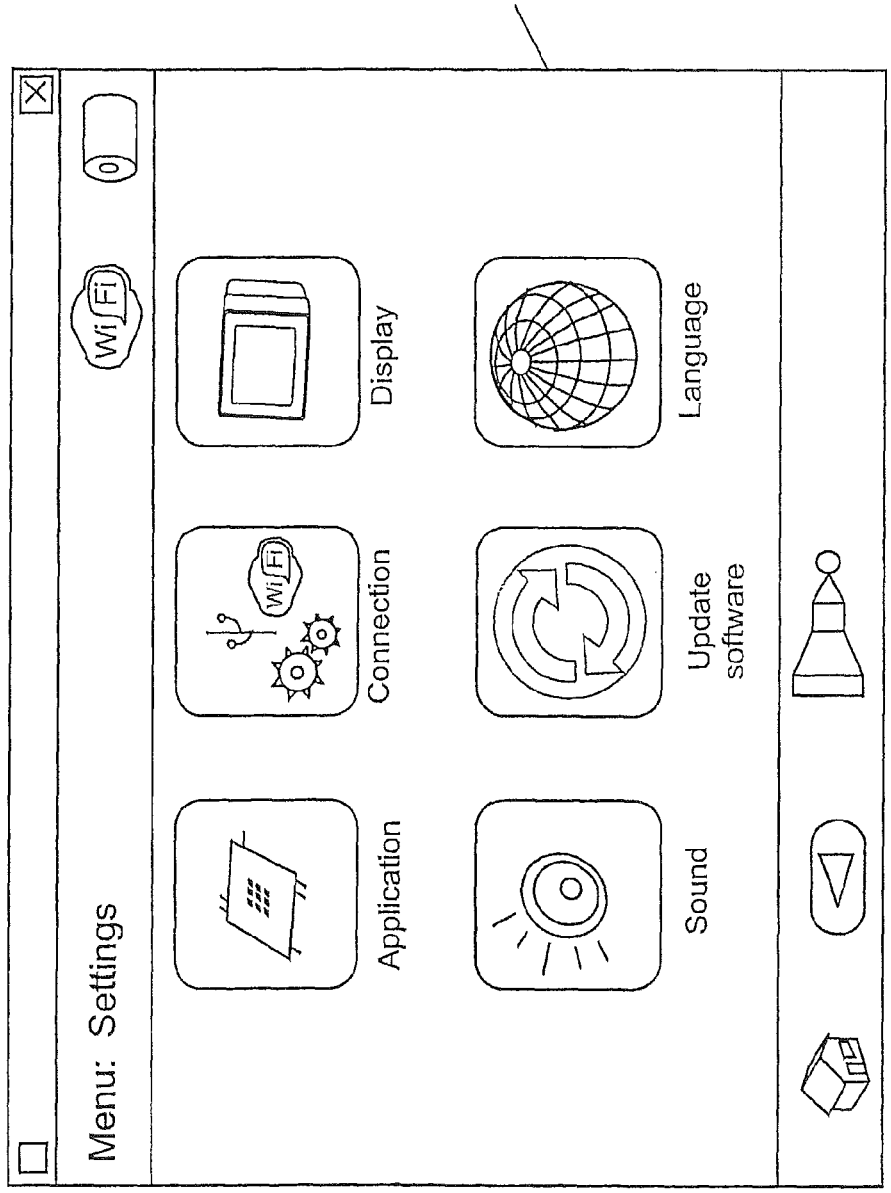

PORTABLE ARTICULATED ARM COORDINATE MEASURING MACHINE HAVING INTEGRATED SOFTWARE CONTROLS

CROSS-REFERENCE TO RELATED APPLICATIONS

The present application is a continuation in part of U.S. patent application Ser. No. 13/006,484, filed Jan. 14, 2011 which in turn claims the benefit of provisional application No. 61/296,555 filed Jan. 20, 2010, the contents of which are hereby incorporated by reference in their entireties. The present application is also a continuation-in-part of U.S. patent application Ser. No. 13/006,503 filed Jan. 14, 2011, which in turn claims the benefit of provisional application No. 61/296,555 filed on Jan. 20, 2010, the contents of which are hereby incorporated by reference in their entireties. The present application is also a continuation-in-part of U.S. patent application Ser. No. 13/006,455 filed Jan. 14, 2011, which in turn claims the benefit of provisional application No. 61/296,555 filed on Jan. 20, 2010, the contents of which are hereby incorporated by reference in their entireties.

BACKGROUND

The present disclosure relates to a coordinate measuring machine, and more particularly to a portable articulated arm coordinate measuring machine having integrated software controls.

Portable articulated arm coordinate measuring machines (AACMMs) have found widespread use in the manufacturing or production of parts where there is a need to rapidly and accurately verify the dimensions of the part during various stages of the manufacturing or production (e.g., machining) of the part. Portable AACMMs represent a vast improvement over known stationary or fixed, cost-intensive and relatively difficult to use measurement installations, particularly in the amount of time it takes to perform dimensional measurements of relatively complex parts. Typically, a user of a portable AACMM simply guides a probe along the surface of the part or object to be measured. The measurement data are then recorded and provided to the user. In some cases, the data are provided to the user in visual form, for example, three-dimensional (3-D) form on a computer screen. In other cases, the data are provided to the user in numeric form, for example when measuring the diameter of a hole, the text "Diameter=1.0034" is displayed on a computer screen.

An example of a prior art portable articulated arm CMM is disclosed in commonly assigned U.S. Pat. No. 5,402,582 ('582), which is incorporated herein by reference in its entirety. The '582 patent discloses a 3-D measuring system comprised of a manually-operated articulated arm CMM having a support base on one end and a measurement probe at the other end. Commonly assigned U.S. Pat. No. 5,611,147 ('147), which is incorporated herein by reference in its entirety, discloses a similar articulated arm CMM. In the '147 patent, the articulated arm CMM includes a number of features including an additional rotational axis at the probe end, thereby providing for an arm with either a two-two-two or a two-two-three axis configuration (the latter case being a seven axis arm).

Contemporary portable AACMMs require a connection to an external computer, such as a laptop, to calculate positional data from the raw measurement data collected by the AACMM. In addition, the external computer also provides a user interface application to allow the operator to give instructions to the AACMM. Thus, an AACMM is required to have a driver that supports communication with a variety of operating systems (and operating system levels). In addition, troubleshooting is often difficult because other applications, including those not related to portable AACMM functions, may also be executing on the external computer and impacting portable AACMM functions. Though current AACMMs are suitable for their intended purpose, it would be desirable to reduce the amount of variability introduced by the use of an external computer in conjunction with the portable AACMM to perform measurement functions.

SUMMARY OF THE INVENTION

An embodiment is a method for performing a diagnostic or calibration procedure on an articulated arm coordinate measurement machine (AACMM). The method includes providing the AACMM. The AACMM has a manually positionable articulated arm portion having opposed first and second ends, and the arm portion includes a plurality of connected arm segments. Each of the arm segments includes at least one position transducer for producing position signals. A measurement device attached to the first end of the AACMM is provided. In addition, an electronic circuit in the AACMM is provided. The electronic circuit includes a processor and is configured to receive the position signals from the transducers and to provide data corresponding to a position of the measurement device. The electronic circuit has a self-contained operating environment for the AACMM that includes a user interface application. A display device attached to the AACMM is also provided. The display device and the electronic circuit are integral parts of the AACMM, and the display device is in communication with the user interface application. A plurality of choices is displayed on the display device, with at least one of the choices being to perform a diagnostic or calibration procedure for the AACMM. One of the diagnostic or calibration procedures is selected based on input from an operator. Information for performing the procedure is displayed on the display device. Based on input from the operator, the selected diagnostic or calibration procedure is performed and the results are displayed on the display device.

BRIEF DESCRIPTION OF THE DRAWINGS

Referring now to the drawings, exemplary embodiments are shown which should not be construed to be limiting regarding the entire scope of the disclosure, and wherein the elements are numbered alike in several FIGURES:

FIG. 1, including FIGS. 1A and 1B, are perspective views of a portable articulated arm coordinate measuring machine (AACMM) having embodiments of various aspects of the present invention therewithin;

FIG. 3, including FIGS. 3A and 3B taken together, is a block diagram describing detailed features of the electronic data processing system of FIG. 2 in accordance with an embodiment;

FIG. 5 is a user interface screen presented to an operator when the AACMM is powered on in accordance with an embodiment;

FIG. 9 is a user interface screen presented to an operator when reviewing features in accordance with an embodiment;

FIG. 11 is a user interface screen presented to an operator when managing settings on the AACMM in accordance with an embodiment;

DETAILED DESCRIPTION

An articulated arm coordinate measuring machine (AACMM) having a self-contained operating environment is provided in accordance with exemplary embodiments. As used herein, the term "self-contained operating environment" refers to the AACMM being portable, with all of the elements required to perform measurement located on the portable AACMM (e.g., within a housing of the AACMM). This is contrasted with an AACMM that requires a laptop, or other processing device, to perform some functions (e.g., calculating positional data from raw measurement data). The self-contained AACMM may be powered by a battery and/or plugged in to a power source (e.g., 120 VAC). In an embodiment, the self-contained AACMM operates in a "kiosk mode" where the software on the AACMM is designed to perform a set of supported functions that are presented to the operator in a user interface screen when the AACMM is powered on. The "kiosk mode" provides a dedicated and controlled environment where the operator does not need to be concerned with the operating environment (e.g., operating system, software versions, etc.) of the AACMM. Further, the operator does not need to be concerned with the nuances of bringing up an operating system and loading particular software. In an embodiment, a user interface screen is presented to the operator when the AACMM is powered on to guide the operator through using the functions provided by the AACMM.

Figure 1B:
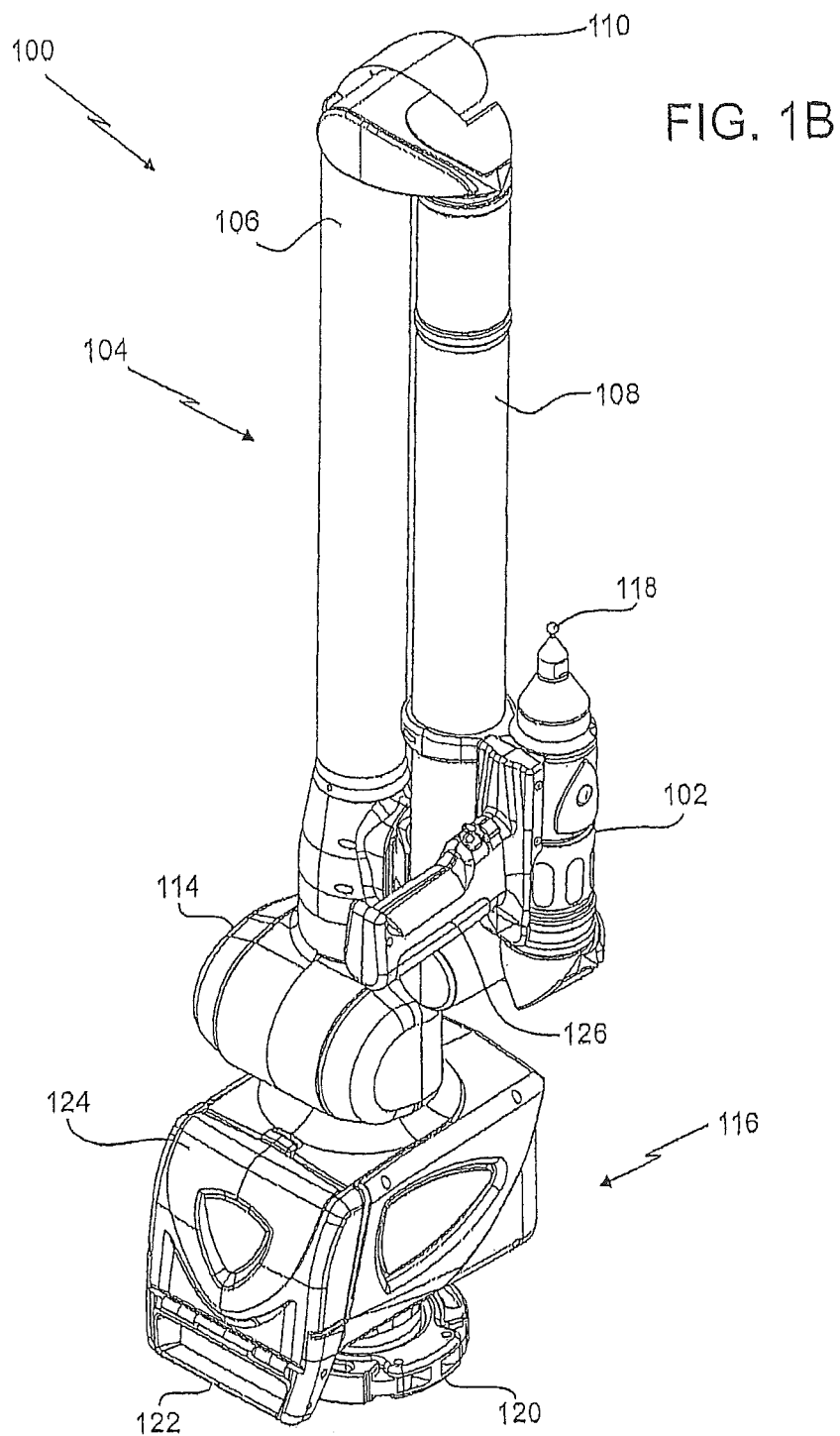

FIGS. 1A and 1B illustrate, in perspective, a portable articulated arm coordinate measuring machine (AACMM) 100 according to various embodiments of the present invention, an articulated arm being one type of coordinate measuring machine. As shown in FIGS. 1A and 1B, the exemplary AACMM 100 may comprise a six or seven axis articulated measurement device having a measurement probe housing 102 coupled to an arm portion 104 of the AACMM 100 at one end. The arm portion 104 comprises a first arm segment 106 coupled to a second arm segment 108 by a first grouping of bearing cartridges 110 (e.g., two bearing cartridges). A second grouping of bearing cartridges 112 (e.g., two bearing cartridges) couples the second arm segment 108 to the measurement probe housing 102. A third grouping of bearing cartridges 114 (e.g., three bearing cartridges) couples the first arm segment 106 to a base 116 located at the other end of the arm portion 104 of the AACMM 100. Each grouping of bearing cartridges 110, 112, 114 provides for multiple axes of articulated movement. Also, the measurement probe housing 102 may comprise the shaft of the seventh axis portion of the AACMM 100 (e.g., a cartridge containing an encoder system that determines movement of the measurement device, for example a probe 118 and/or a peripheral device, in the seventh axis of the AACMM 100). In use of the AACMM 100, the base 116 is typically affixed to a work surface.

Each bearing cartridge within each bearing cartridge grouping 110, 112, 114 typically contains an encoder system (e.g., an optical encoder system). The encoder system (i.e., transducer) provides an indication of the position of the respective arm segments 106, 108 and corresponding bearing cartridge groupings 110, 112, 114, that all together provide an indication of the position of the probe 118 with respect to the base 116 (and, thus, the position of the object being measured by the AACMM 100 in a certain frame of reference—for example a local or global frame of reference). The arm segments 106, 108 may be made from a suitably rigid material such as but not limited to a carbon composite material for example. A portable AACMM 100 with six or seven axes of articulated movement (i.e., degrees of freedom) provides advantages in allowing the operator to position the probe 118 in a desired location within a 360° area about the base 116 while providing an arm portion 104 that may be easily handled by the operator. However, it should be appreciated that the illustration of an arm portion 104 having two arm segments 106, 108 is for exemplary purposes, and the claimed invention should not be so limited. An AACMM 100 may have any number of arm segments coupled together by bearing cartridges (and, thus, more or less than six or seven axes of articulated movement or degrees of freedom).

The probe 118 is detachably mounted to the measurement probe housing 102, which is connected to bearing cartridge grouping 112. A handle 126 is removable with respect to the measurement probe housing 102 by way of, for example, a quick-connect interface. The handle 126 may be replaced with another device (e.g., a laser line probe, a bar code reader), thereby providing advantages in allowing the operator to use different measurement devices with the same AACMM 100. In exemplary embodiments, the probe housing 102 houses a removable probe 118, which is a contacting measurement device and may have different tips 118 that physically contact the object to be measured, including, but not limited to: ball, touch-sensitive, curved and extension type probes. In other embodiments, the measurement is performed, for example, by a non-contacting device such as a laser line probe (LLP). In an embodiment, the handle 126 is replaced with the LLP using the quick-connect interface. Other types of measurement devices may replace the removable handle 126 to provide additional functionality. Examples of such measurement devices include, but are not limited to, one or more illumination lights, a temperature sensor, a thermal scanner, a bar code scanner, a projector, a paint sprayer, a camera, or the like.

As shown in FIGS. 1A and 1B, the AACMM 100 includes the removable handle 126 that provides advantages in allowing accessories or functionality to be changed without removing the measurement probe housing 102 from the bearing cartridge grouping 112. As discussed in more detail below with respect to FIG. 2, the removable handle 126 may also include an electrical connector that allows electrical power and data to be exchanged with the handle 126 and the corresponding electronics located in the probe end.

In various embodiments, each grouping of bearing cartridges 110, 112, 114 allows the arm portion 104 of the AACMM 100 to move about multiple axes of rotation. As mentioned, each bearing cartridge grouping 110, 112, 114 includes corresponding encoder systems, such as optical angular encoders for example, that are each arranged coaxially with the corresponding axis of rotation of, e.g., the arm segments 106, 108. The optical encoder system detects rotational (swivel) or transverse (hinge) movement of, e.g., each one of the arm segments 106, 108 about the corresponding axis and transmits a signal to an electronic data processing system within the AACMM 100 as described in more detail herein below. Each individual raw encoder count is sent separately to the electronic data processing system as a signal where it is further processed into measurement data. No position calculator separate from the AACMM 100 itself (e.g., a serial box) is required, as disclosed in commonly assigned U.S. Pat. No. 5,402,582 ('582).

The base 116 may include an attachment device or mounting device 120. The mounting device 120 allows the AACMM 100 to be removably mounted to a desired location, such as an inspection table, a machining center, a wall or the floor for example. In one embodiment, the base 116 includes a handle portion 122 that provides a convenient location for the operator to hold the base 116 as the AACMM 100 is being moved. In one embodiment, the base 116 further includes a movable cover portion 124 that folds down to reveal a user interface, such as a display screen.

In accordance with an embodiment, the base 116 of the portable AACMM 100 contains or houses an electronic data processing system that includes two primary components: a base processing system that processes the data from the various encoder systems within the AACMM 100 as well as data representing other arm parameters to support three-dimensional (3-D) positional calculations; and a user interface processing system that includes an on-board operating system, a touch screen display, and resident application software that allows for relatively complete metrology functions to be implemented within the AACMM 100 without the need for connection to an external computer.

The electronic data processing system in the base 116 may communicate with the encoder systems, sensors, and other peripheral hardware located away from the base 116 (e.g., a LLP that can be mounted to the removable handle 126 on the AACMM 100). The electronics that support these peripheral hardware devices or features may be located in each of the bearing cartridge groupings 110, 112, 114 located within the portable AACMM 100.

Figure 2A:
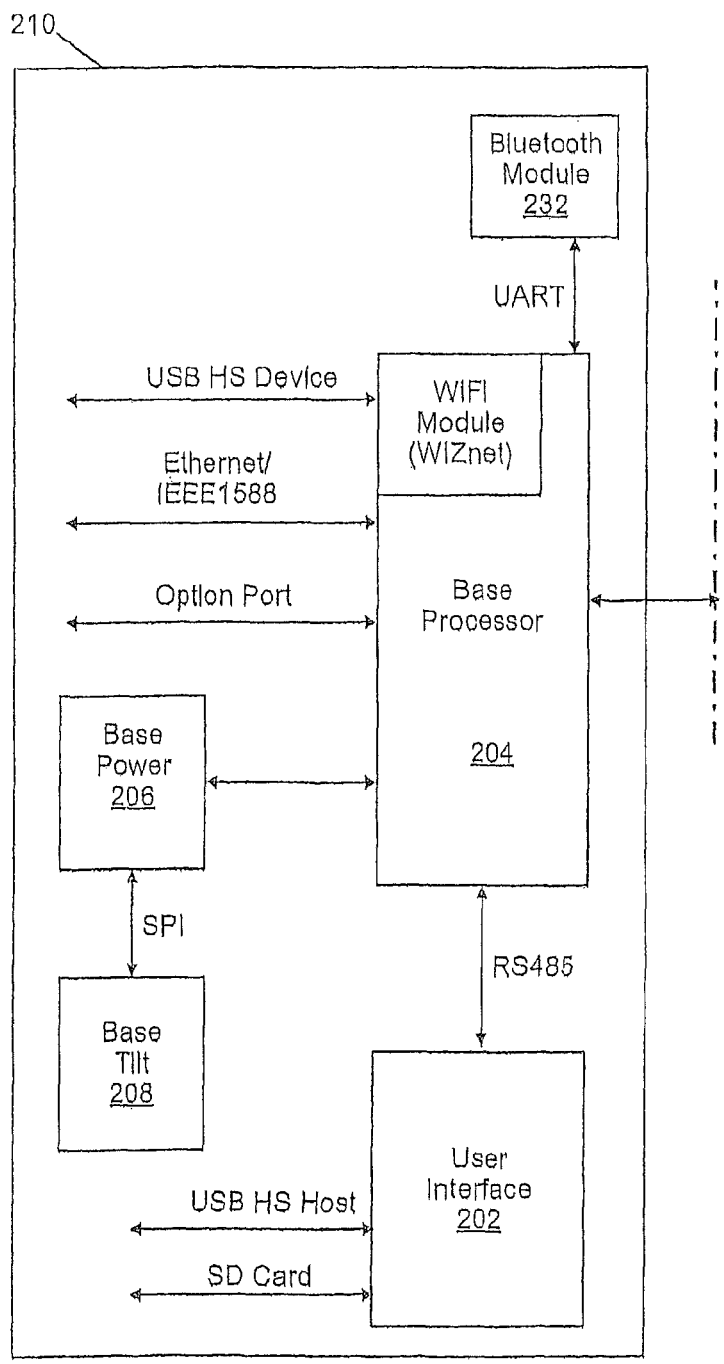
FIG. 2, including FIGS. 2A-2D taken together, is a block diagram of electronics utilized as part of the AACMM of FIG. 1 in accordance with an embodiment.
Figure 2B:
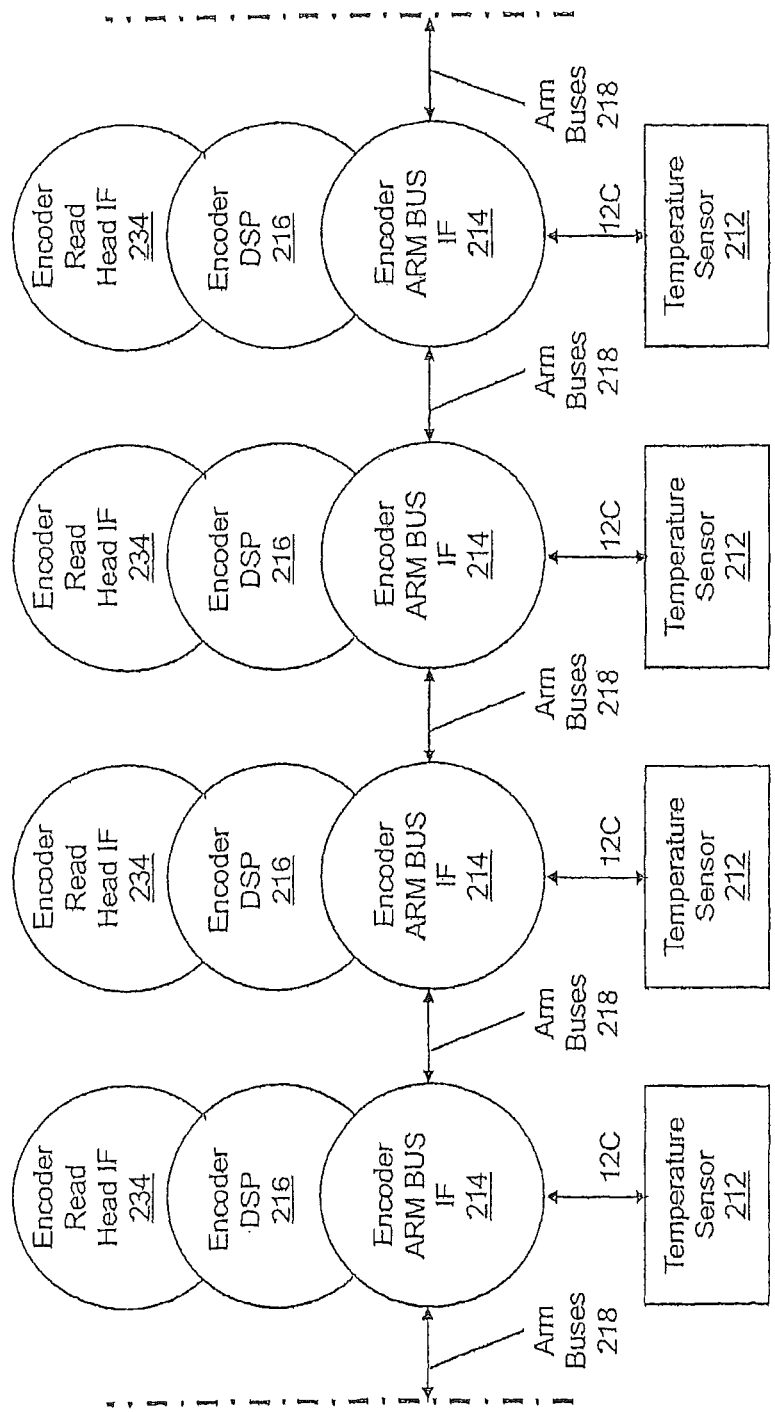
Figure 2C:
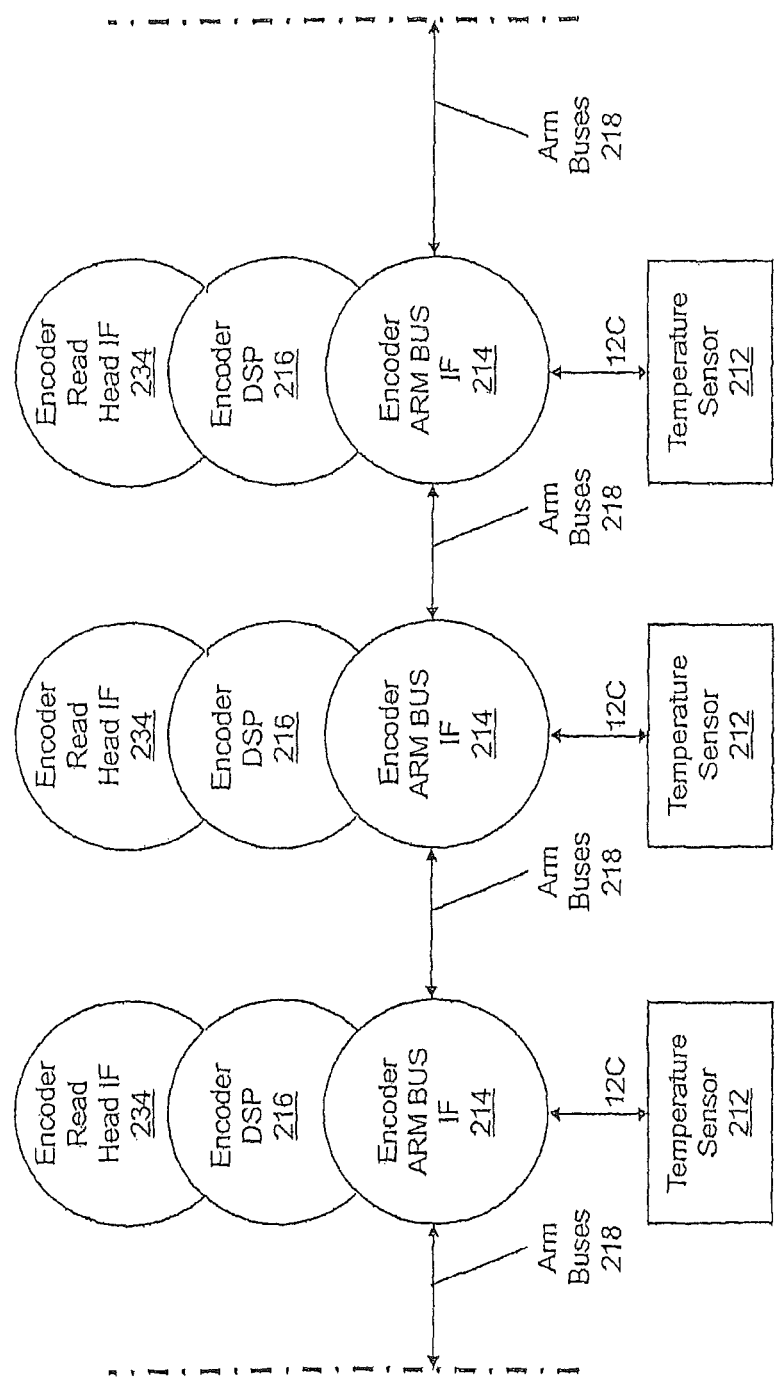
Figure 2D:
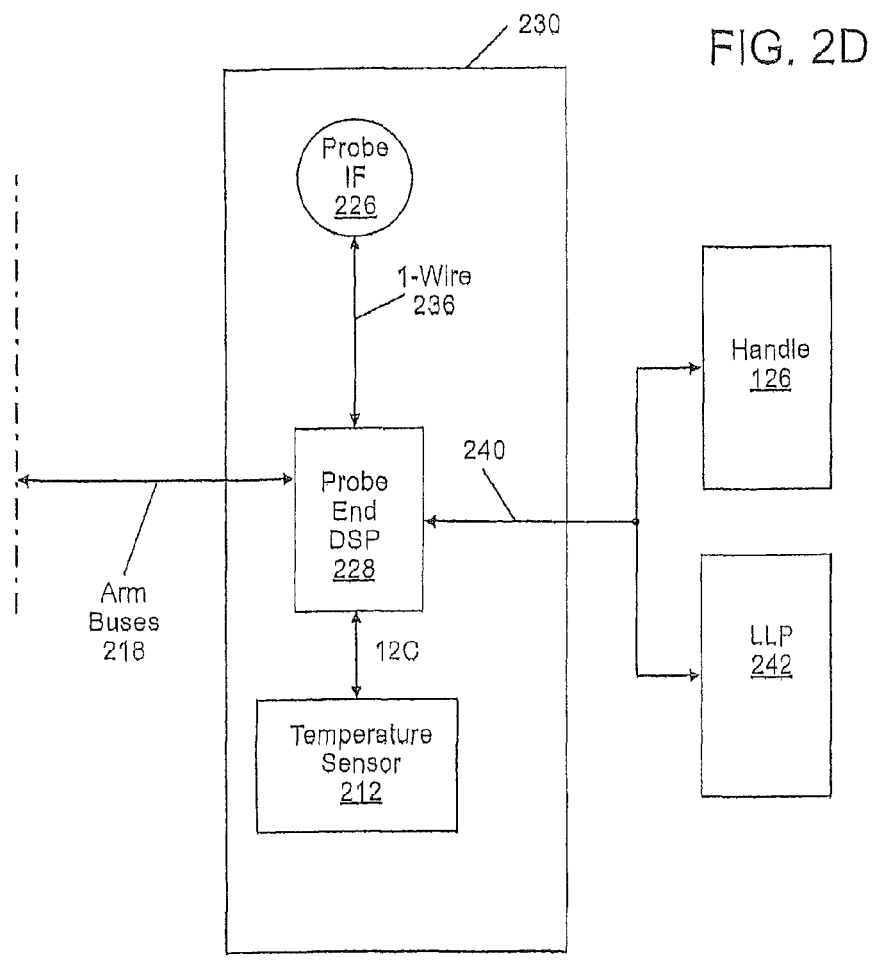
Figure 2:
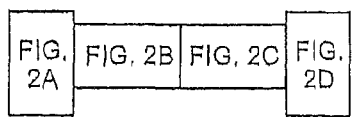

FIG. 2 is a block diagram of electronics utilized in an AACMM 100 in accordance with an embodiment. The embodiment shown in FIG. 2 includes an electronic data processing system 210 including a base processor board 204 for implementing the base processing system, a user interface board 202, a base power board 206 for providing power, a Bluetooth module 232, and a base tilt board 208. The user interface board 202 includes a computer processor for executing user interface application software to perform user interface, display, and other functions described herein.

As shown in FIG. 2, the electronic data processing system 210 is in communication with the aforementioned plurality of encoder systems via one or more arm buses 218. In the embodiment depicted in FIG. 2, each encoder system generates encoder data and includes: an encoder arm bus interface 214, an encoder digital signal processor (DSP) 216, an encoder read head interface 234, and a temperature sensor 212. Other devices, such as strain sensors, may be attached to the arm bus 218.

Also shown in FIG. 2 are probe end electronics 230 that are in communication with the arm bus 218. The probe end electronics 230 include a probe end DSP 228, a temperature sensor 212, a handle/LLP interface bus 240 that connects with the handle 126 or the LLP 242 via the quick-connect interface in an embodiment, and a probe interface 226. The quick-connect interface allows access by the handle 126 to the data bus, control lines, and power bus used by the LLP 242 and other accessories. In an embodiment, the probe end electronics 230 are located in the measurement probe housing 102 on the AACMM 100. In an embodiment, the handle 126 may be removed from the quick-connect interface and measurement may be performed by the laser line probe (LLP) 242 communicating with the probe end electronics 230 of the AACMM 100 via the handle/LLP interface bus 240. In an embodiment, the electronic data processing system 210 is located in the base 116 of the AACMM 100, the probe end electronics 230 are located in the measurement probe housing 102 of the AACMM 100, and the encoder systems are located in the bearing cartridge groupings 110, 112, 114. The probe interface 226 may connect with the probe end DSP 228 by any suitable communications protocol, including commercially-available products from Maxim Integrated Products, Inc. that embody the 1-wire® communications protocol 236.

FIG. 3 is a block diagram describing detailed features of the electronic data processing system 210 of the AACMM 100 in accordance with an embodiment. In an embodiment, the electronic data processing system 210 is located in the base 116 of the AACMM 100 and includes the base processor board 204, the user interface board 202, a base power board 206, a Bluetooth module 232, and a base tilt module 208.

In an embodiment shown in FIG. 3, the base processor board 204 includes the various functional blocks illustrated therein. For example, a base processor function is utilized to support the collection of measurement data from the AACMM 100 and receives raw arm data (e.g., encoder system data) via the arm bus 218 and a bus control module function 308. The memory function 304 stores programs and static arm configuration data. The base processor board 204 also includes an external hardware option port function 310 for communicating with any external hardware devices or accessories such as an LLP 242. A real time clock (RTC) and log 306, a battery pack interface (IF) 316, and a diagnostic port 318 are also included in the functionality in an embodiment of the base processor board 204 depicted in FIG. 3.

The base processor board 204 also manages all the wired and wireless data communication with external (host computer) and internal (display processor 202) devices. The base processor board 204 has the capability of communicating with an Ethernet network via an Ethernet function 320 (e.g., using a clock synchronization standard such as Institute of Electrical and Electronics Engineers (IEEE) 1588), with a wireless local area network (WLAN) via a LAN function 322, and with Bluetooth module 232 via a parallel to serial communications (PSC) function 314. The base processor board 204 also includes a connection to a universal serial bus (USB) device 312.

The base processor board 204 transmits and collects raw measurement data (e.g., encoder system counts, temperature readings) for processing into measurement data without the need for any preprocessing, such as disclosed in the serial box of the aforementioned '582 patent. The base processor board 204 sends the processed data to the display processor 328 on the user interface board 202 via an RS485 interface (IF) 326.

In an embodiment, the base processor board 204 also sends the raw measurement data to an external computer.

Turning now to the user interface board 202 in FIG. 3, the angle and positional data received by the base processor is utilized by applications executing on the display processor 328 to provide an autonomous metrology system within the AACMM 100. Applications may be executed on the display processor 328 to support functions such as, but not limited to: measurement of features, guidance and training graphics, remote diagnostics, temperature corrections, control of various operational features, connection to various networks, and display of measured objects. Along with the display processor 328 and a liquid crystal display (LCD) 338 (e.g., a touch screen LCD) user interface, the user interface board 202 includes several interface options including a secure digital (SD) card interface 330, a memory 332, a USB Host interface 334, a diagnostic port 336, a camera port 340, an audio/video interface 342, a dial-up/cell modem 344 and a global positioning system (GPS) port 346.

The electronic data processing system 210 shown in FIG. 3 also includes a base power board 206 with an environmental recorder 362 for recording environmental data. The base power board 206 also provides power to the electronic data processing system 210 using an AC/DC converter 358 and a battery charger control 360. The base power board 206 communicates with the base processor board 204 using inter-integrated circuit (I2C) serial single ended bus 354 as well as via a DMA serial peripheral interface (DSPI) 356. The base power board 206 is connected to a tilt sensor and radio frequency identification (RFID) module 208 via an input/output (I/O) expansion function 364 implemented in the base power board 206.

Though shown as separate components, in other embodiments all or a subset of the components may be physically located in different locations and/or functions combined in different manners than that shown in FIG. 3. For example, in one embodiment, the base processor board 204 and the user interface board 202 are combined into one physical board.

Figure 4:
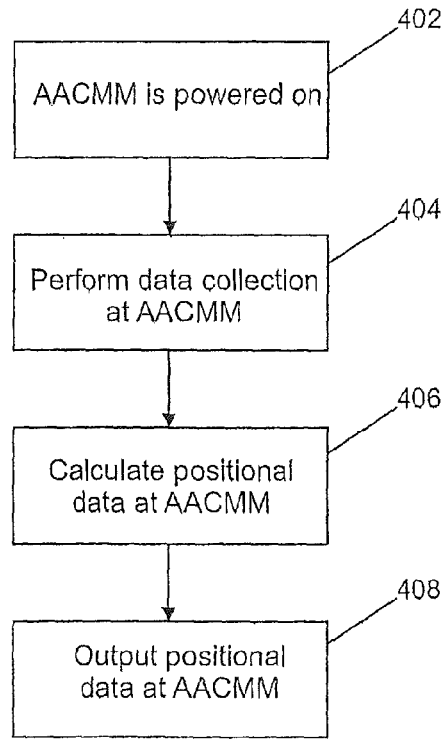
FIG. 4 is a flow diagram of a process for implementing a self-contained operating environment on the AACMM in accordance with an embodiment.
Figure 9:
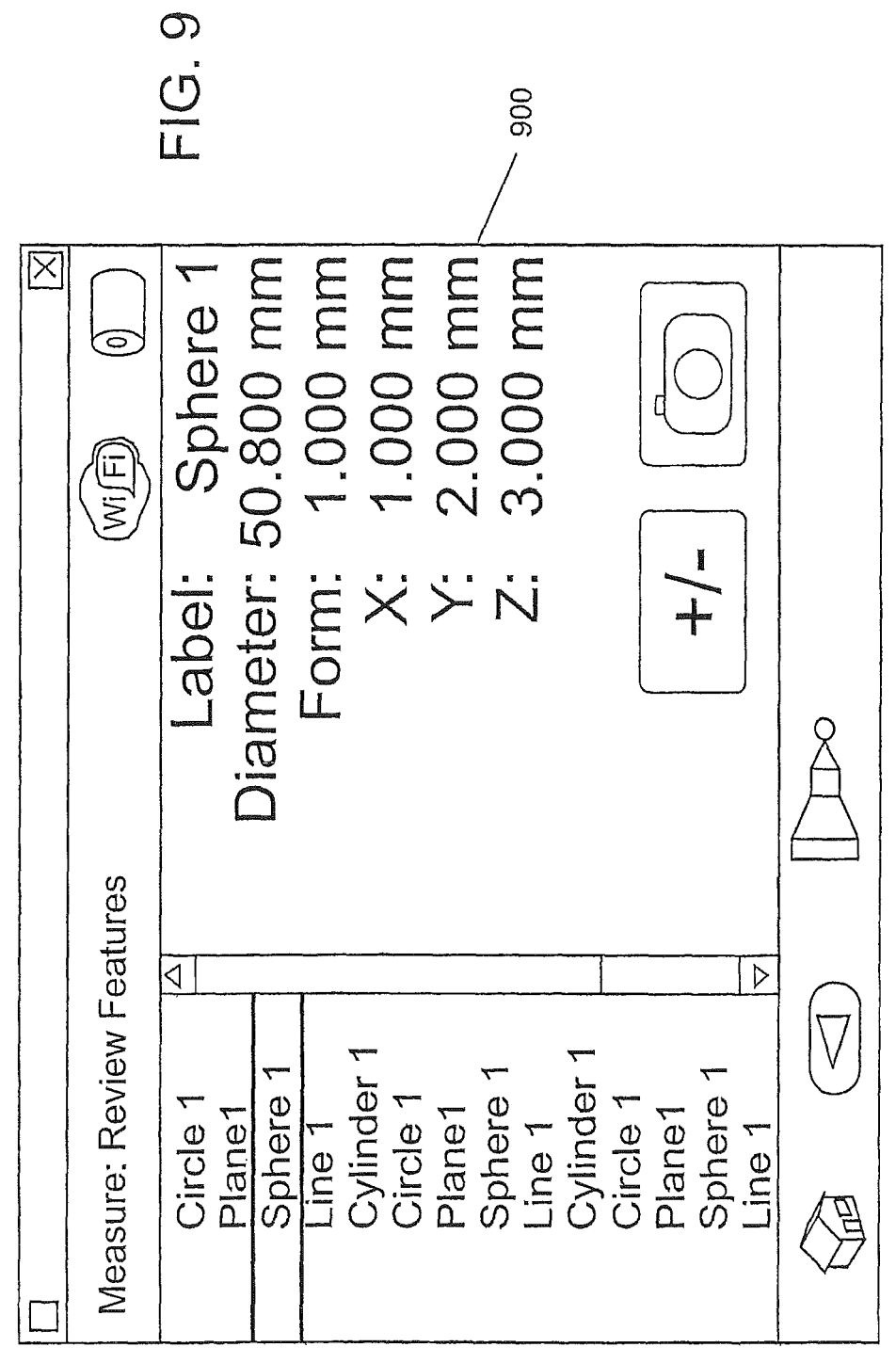

FIG. 4 illustrates a process flow for providing an AACMM 100 having a self-contained operating environment in accordance with an embodiment. In an embodiment, the self-contained operating environment uses a commercially available operating system such as, but not limited to, Windows CE. The process shown in FIG. 4 is performed by the electronic data processing system 210 (also referred to herein as an "electronic circuit"). At step 402, the AACMM 100 is powered on and a user interface screen, such as that shown in FIG. 5, is presented to the operator via the LCD 338. At step 404, user interface screens, such as those shown in FIGS. 6-7, step the user through a data collection process. At step 406, positional data is calculated at the base processor board 204 of the AACMM 100, and at step 408, the positional data is output to a user interface application and/or to an application programming interface. If the positional data is output to the user interface application, then user interface screens such as those shown in FIGS. 8-9 are displayed. In an embodiment, the application programming interface communicates with one or more applications executing on the AACMM (e.g., on the display processor 328, on the coldfire processor 302) to perform one or more of the functions described herein. In an embodiment, the application programming interface also interfaces with one or more applications executing external to the AACMM (e.g., CAD/CAM software, measurement software). The user interface application is a specialized application that interfaces with a user interface device such as the color LCD 338 to communicate with the operator.

FIG. 5 is a main menu user interface screen 500 presented to an operator when the AACMM 100 is powered on in accordance with an embodiment. In an embodiment, the main menu user interface screen 500 depicted in FIG. 5 is displayed on the LCD 338 on the user interface board 202. In an embodiment, the user interface board 202 includes resident user interface applications (e.g., stored in the memory 332) and executed by the display processor 328 for providing a graphical user interface (GUI) with selectable menu options corresponding to the available functions implemented by the AACMM 100. The GUI may be implemented as a set of menu options, such as those shown in FIG. 5. In FIG. 5, a main menu user interface screen 500 displayed on the LCD 338 illustrates various menu options, such as "Part Setup" (e.g., for specifying part elements such as planes, lines, circles, and cylinders), "Measure" (e.g., for specifying features, lengths, angles, and positions), "Files" (e.g., for defining new parts, loading macros, and transferring data), "Settings" (e.g., for specifying applications, network connections, display characteristics, sound elements, power parameters, and languages), and "Diagnostics" (e.g., for performing diagnostics such as those shown in FIG. 13 below). In an embodiment, an operator makes a selection (e.g., by touching the screen on the LCD 338) to initiate an action. The main menu user interface screen 500 includes several icons: a probe tip at the bottom which, when selected, brings up compensation screens used to determine a location of the probe; a battery in the top right which indicates how much battery power still remains which is helpful to the operator when the AACMM 100 is being powered by a battery; and network icon ("WiFi") which indicates current network connections. The icons shown in FIG. 5 are exemplary in nature as other icons to show status and/or to initiate fast paths to functions may be implemented by other embodiments.

Figure 6:
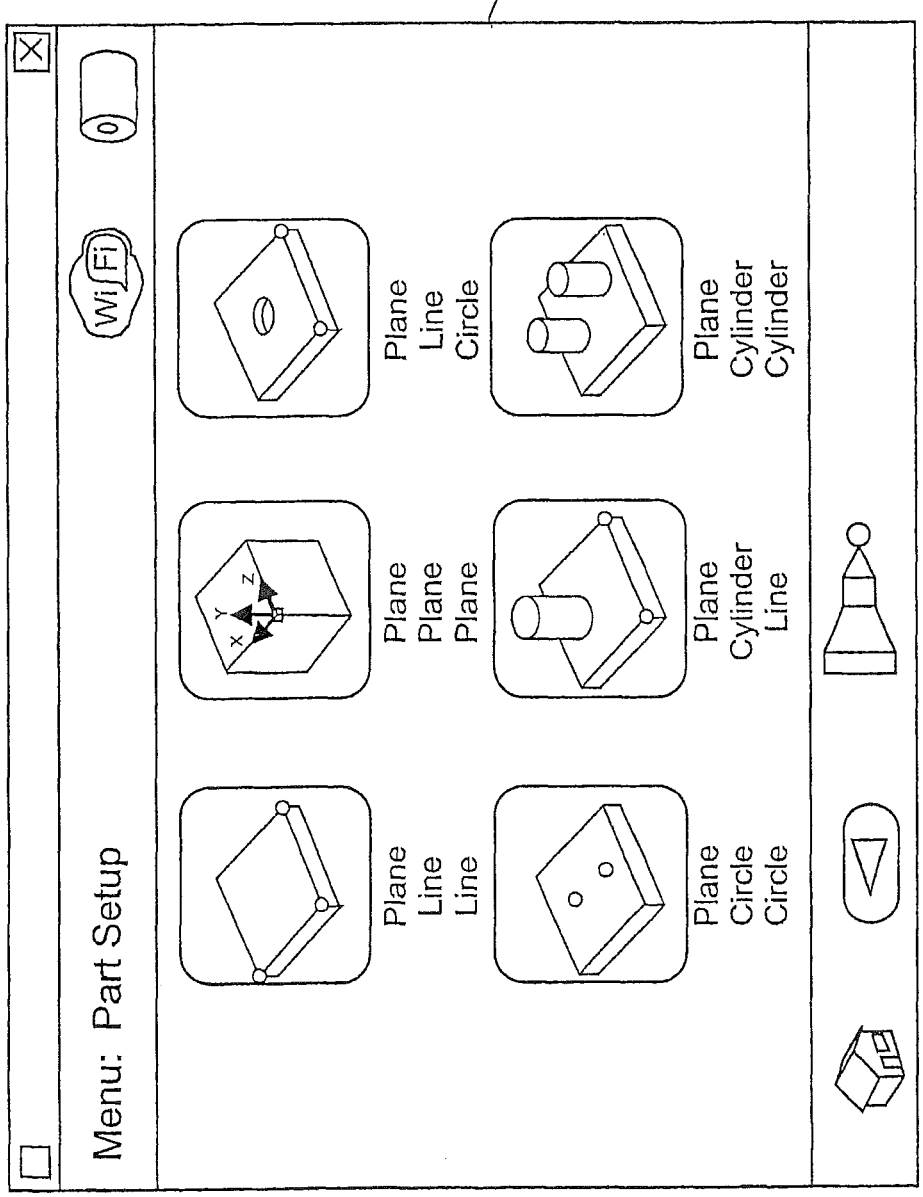
FIG. 6 is a user interface screen presented to an operator when performing part setup in accordance with an embodiment.

FIG. 6 is a part setup user interface screen 600 presented to an operator when the operator selects "Part Setup" on the main menu user interface screen 500 shown in FIG. 5. In an embodiment, the part setup user interface screen 600 is used by the operator to select a type of part measurement to be performed during data collection. The part setup user interface screen 600 has an icon shaped like a house which is used to bring the operator back to the main menu user interface screen 500, and an icon shaped like an arrow to bring the operator back to a previous user interface screen.

Figure 7:
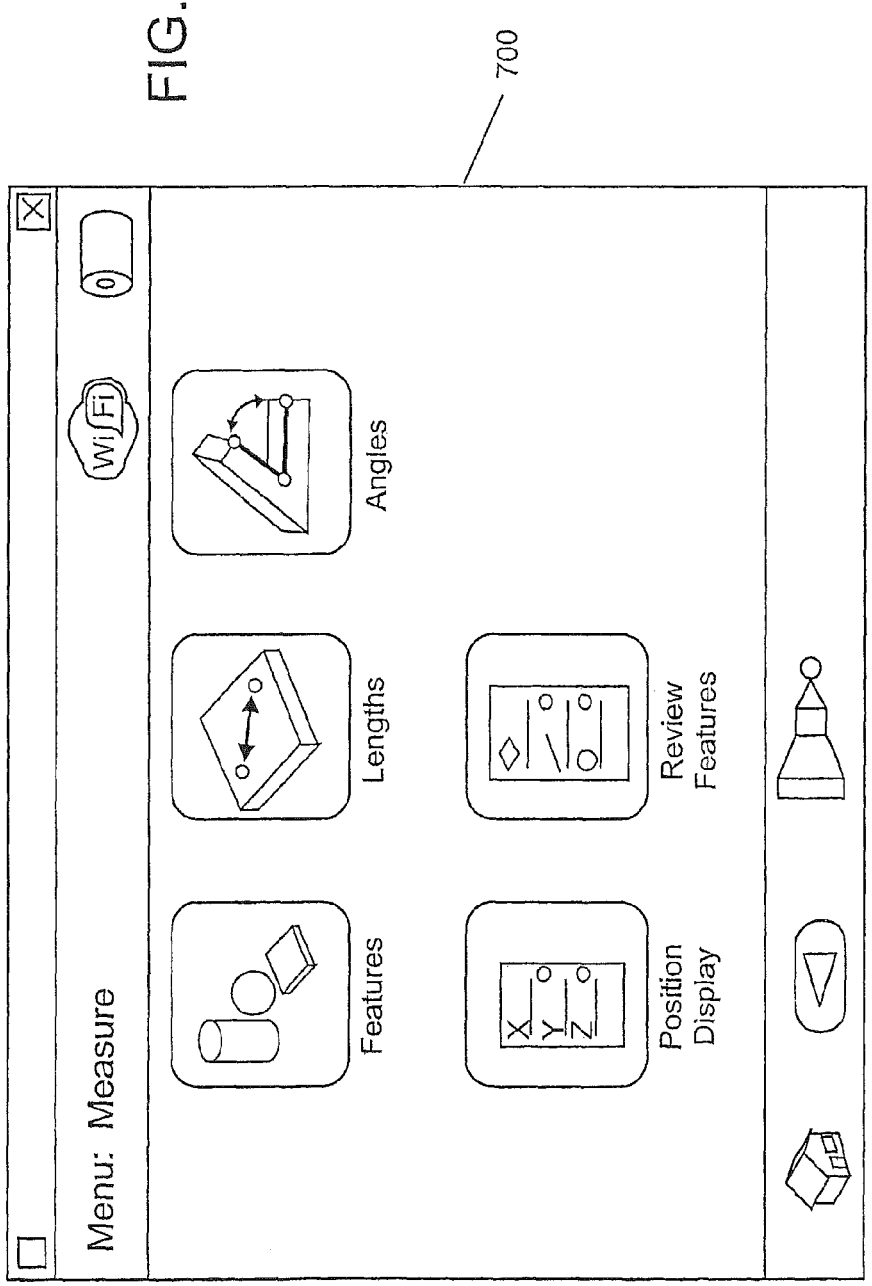
FIG. 7 is a user interface screen presented to an operator when performing measurement in accordance with an embodiment.
Figure 8:
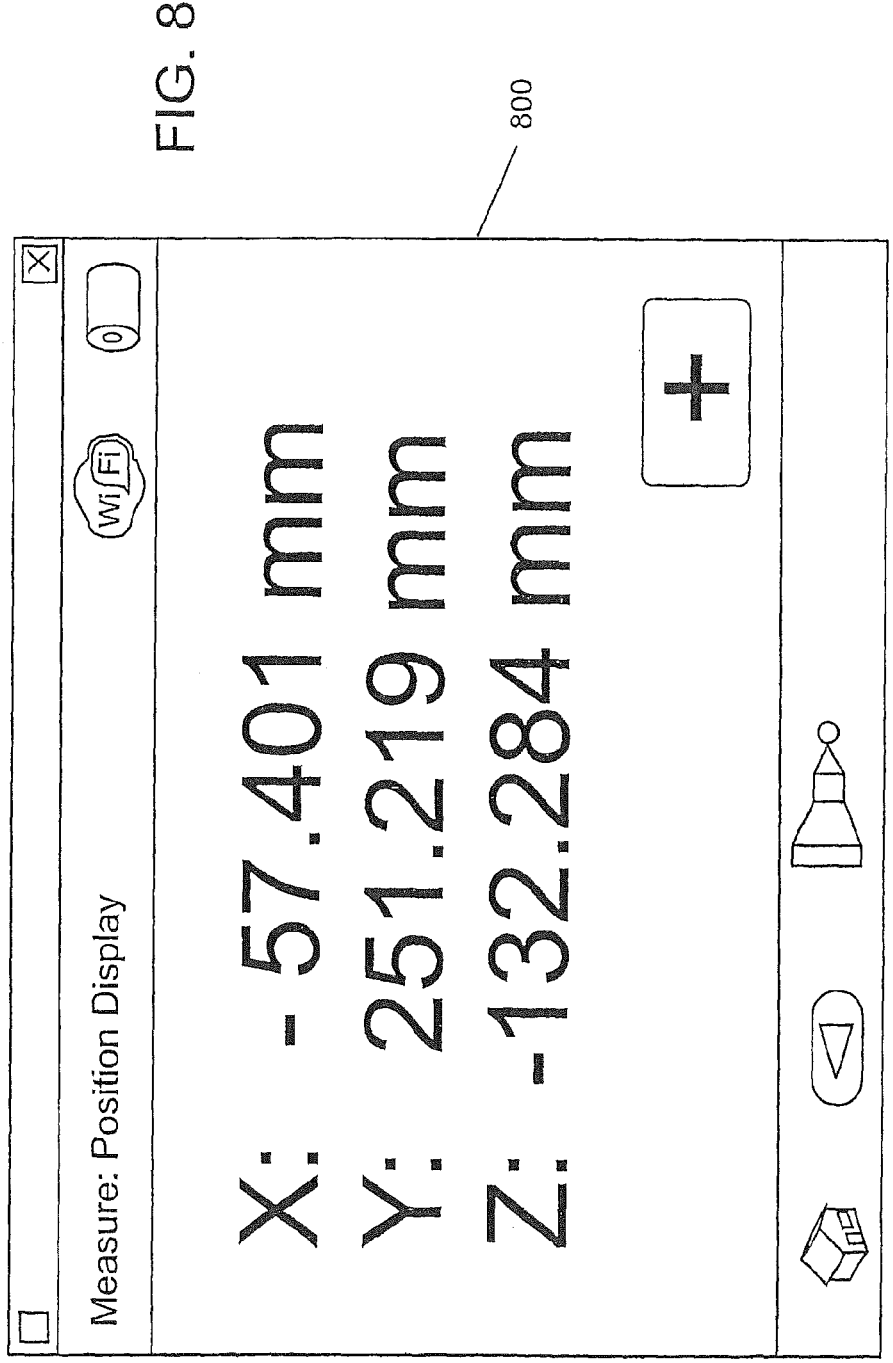
FIG. 8 is a user interface screen presented to an operator when displaying position data.

FIG. 7 is a measure user interface screen 700 presented to an operator for performing part measurement in accordance with an embodiment. The measure user interface screen 700 is displayed when the operator selects "Measure" on the main menu user interface screen 500 shown in FIG. 5. The measure user interface screen 700 options include "Features", "Lengths", "Angles", "Position Display", and "Review Features". Examples of features (that may be selected on a subsequent screen or pop-up window) include, but are not limited to circle, cylinder, line, plane, point, and sphere. In an embodiment, once a feature is selected, additional user interface screens step the operator through the measurement process to collect raw measurement data. For example, if a plane is selected, a picture of a plane is displayed on the LCD 338 along with dots indicating which measurement point to take next. As described previously, the measurement device may be implemented by any number of devices including a touch probe where a measurement point is taken by pressing the touch probe to the part being measured. Examples of lengths include, but are not limited to point-to-point, point-to-plane, plane-to-plane, sphere-to-sphere, and circle-to-circle. Examples of angles include, but are not limited to plane-to-plane, plane-to-cylinder, line-to-line, and apex. In an embodiment, once a length or angle is selected, additional user interface screens step the user through the measurement process to collect raw measurement data (also referred to herein as position signals).

FIG. 8 is a position display user interface screen 800 presented to an operator when the operator selects "Position Display" from the measure user interface screen 700 as shown in FIG. 7. The position data is calculated by the AACMM 100 based on the raw measurement data. An operator may view, via the position display user interface screen 800, position data for each of the selected measurement points. Further details, such as the raw measurement data (e.g., including angles and temperatures at each encoder system) may also be output to the operator.

FIG. 9 is a review features user interface screen 900 presented to an operator when the operator selects "Review Features" from the measure user interface screen 700 as shown in FIG. 7. Using the review features user interface screen 900, an operator may view position data of measured features. FIG. 9 has a camera icon that is displayed when a camera (e.g., a web camera) is plugged in to the AACMM 100. The web camera can be used to take a picture of the part being measured. The picture can then be saved, measurement points can be overlaid on the picture, and the picture displayed and used to assist an operator in measuring the part.

Figure 10:
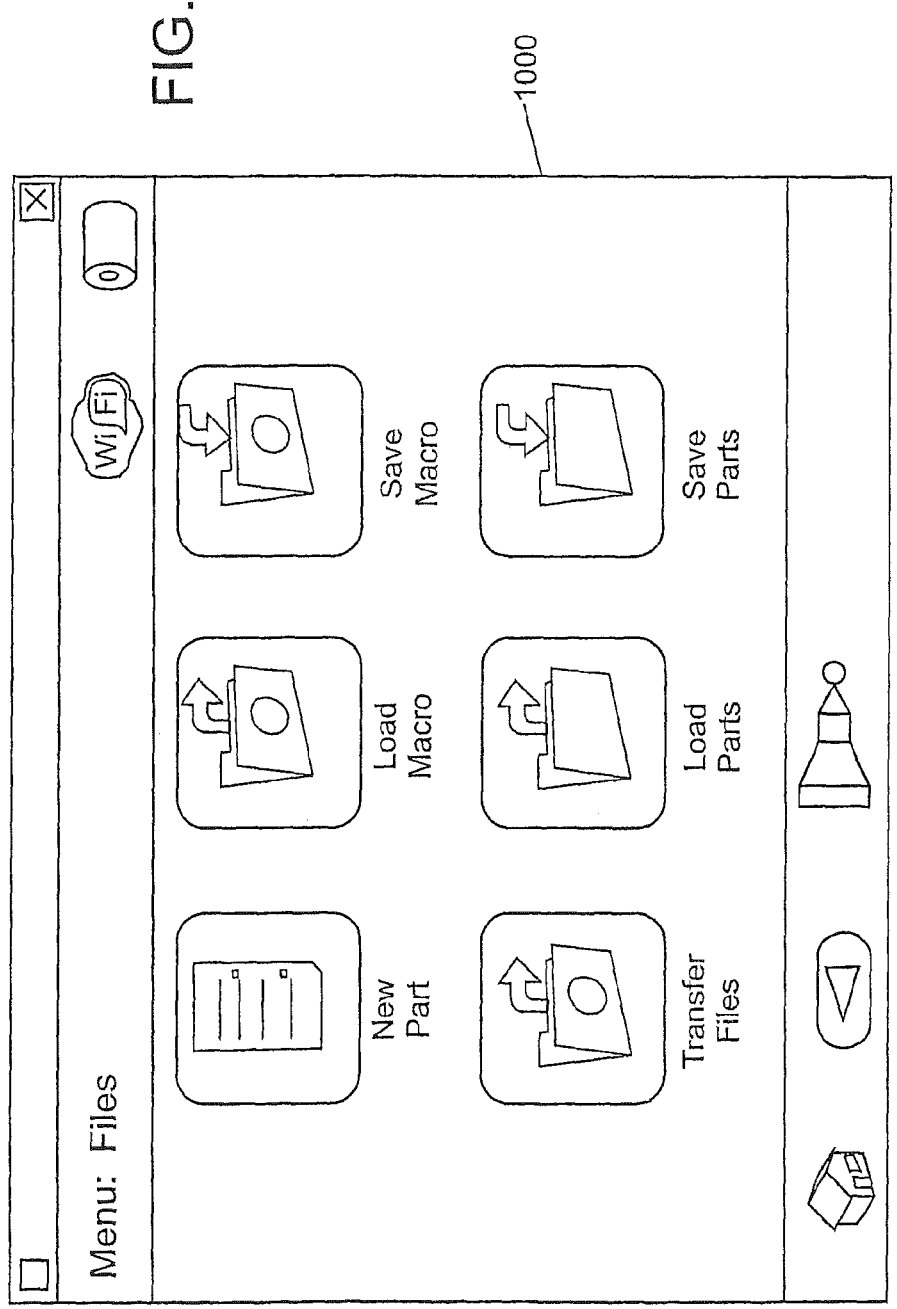
FIG. 10 is a user interface screen presented to an operator when managing files on the AACMM in accordance with an embodiment.

FIG. 10 is a files user interface screen 1000 presented to an operator when managing files on the AACMM 100 in accordance with an embodiment. The files user interface screen 1000 is displayed on the LCD 338 when the operator selects "Files" on the main menu user interface screen 500 shown in FIG. 5. In an embodiment, the files user interface screen 1000 is used by the operator to manage files on the AACMM 100. When "New Part" is selected, a file to store measurement data for a new part is opened. When "Transfer Files" is selected, the operator is prompted to transfer parts and/or macro files between two or more of a USB, a SD and an on-board flash memory. When "Load Macro" is selected, a sequence of measurement steps is shown to guide an operator through measuring a part. When "Load Parts" is selected, measurement data already taken for a part is displayed (e.g., for review). When "Save Macro" is selected, the operator is prompted to save a macro, and when "Save Parts" is selected, the operator is prompted to save part data.

FIG. 11 is a settings user interface screen 1100 presented to an operator when managing settings on the AACMM 100 in accordance with an embodiment. The settings user interface screen 1100 is displayed on the LCD 338 when the operator selects "Settings" on the main menu user interface screen 500 shown in FIG. 5. An operator may change application settings, connection settings, display settings, sound settings, update software, and language settings. In an embodiment, application settings may be updated by the operator. For example, the minimum point distance may be adjusted, scanning may be enabled/disabled and/or a current time may be set. Similarly, network connection settings; display settings (size of font, colors, etc.); sound settings (volume, type of sound, etc.); update software; and language settings (French, English, etc.) may be updated by the operator. The ranges of items that can be changed and the values that they can be changed to are dictated by a current operating environment of the AACMM 100. The current operating environment includes software and/or hardware interfaces to each of the elements that may be set. For example, the display interface defines the universe of display attributes that may be updated, and includes valid values of any attributes. Similar interfaces are provided for the connections, sound, software updates, and language elements. In an embodiment, when an operator selects update software, a list containing the current (or latest) software version and the version of the software on the AACMM 100 is displayed, and the operator may be prompted through a software upgrade process. Alternatively, the list may include all or a subset of supported software versions between the software version on the AACMM 100 and the latest software version available.

Figure 12:
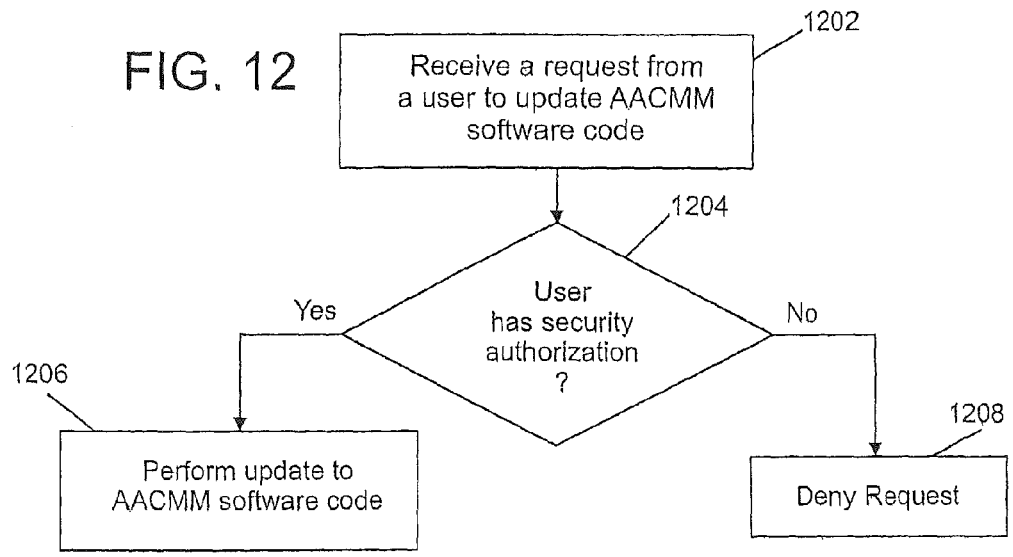
FIG. 12 is a is a flow diagram of a process for verifying that requested updates to the AACMM are authorized in accordance with an embodiment.

FIG. 12 is a is a flow diagram of a process for verifying that requested updates to the AACMM 100 are authorized in accordance with an embodiment. At step 1202, a request to update AACMM 1000 software code is received from a user. In an embodiment, the update request is initiated from a sub-menu of the settings user interface screen 1100 shown in FIG. 11. For example, the sub-menu may have an "update application software" option that the operator has selected. In an embodiment, the application software includes any logic instructions being used by the self-contained operating environment of the AACMM 100. This includes, but is not limited to, any updates to application software, the application programming interface, the user interface application, the connection interface, the display interface, the sound interface, the power interface, and the language interface, the operating system. For example, the update may include allowing the display interface to support a new setting, allowing the language interface to support a new language, modifying a user interface screen, etc. In order to keep a controlled environment, block 1204 is performed to verify that the user (e.g., the operator and/or source of the update) has authorization to make the update. The authorization is performed in any manner known in the art. If the user does not have authorization, the request is denied at block 1208. If the user does have authorization, the update to the AACMM 100 is performed at block 1206.

Figure 13:
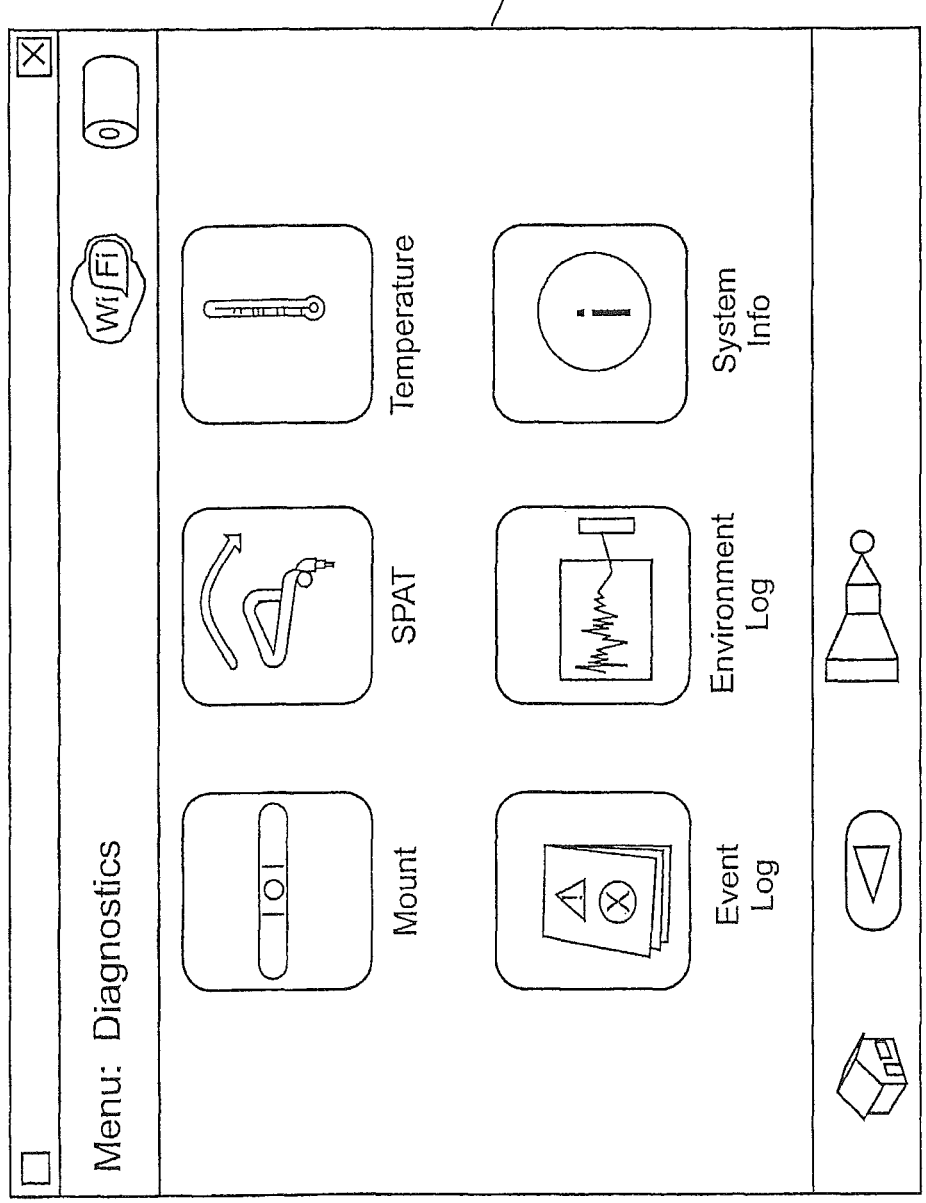
FIG. 13 is a user interface screen presented to an operator when performing diagnostics in accordance with an embodiment.

FIG. 13 is a diagnostics user interface screen 1300 presented to an operator in accordance with an embodiment when "Diagnostics" is selected as an option from FIG. 5. As shown in FIG. 13, the operator is given the option to verify that that mount is stable (also referred to herein as an inclinometer stability test), to perform a single point articulation test (SPAT) (described below in reference to FIGS. 14 and 15), to perform a temperature stability test, to view an event log of results of previous diagnostics tests, to view an environment log(e.g., of ambient temperature, humidity, or other data collected by the environmental recorder 362), and to view system information (e.g., software levels, part numbers, and/or help information). Data collected from the environmental recorder 362 may be read and displayed to an operator (e.g., via LCD 338). This data may include historical event data triggered by shock or vibration, and/or data collected when the environmental recorder 362 automatically awakens at predetermined intervals to record data from all or a subset of the sensors. In an embodiment, the display of the data includes an automatic interpretation of the data including relating an event (e.g., extreme shock) to a change in performance.

If the operator selects "Mount" on FIG. 13, a mount stability diagnostic test is executed using, for example, input from the tilt sensor 366 (or other on board level) and from an operator. In an embodiment, the AACMM 100 is mounted to a surface (e.g., a table, a machining center, a wall, a floor) using the mounting device 120. The operator applies pressure to the mounting device 120 in an attempt to move the AACMM 100. In an embodiment, the tilt sensor (inclinometer) 366 indicates (e.g., via text, graphics, color) any movement of the mounting device 120 to the operator via the color LCD 338 or other display device. In another embodiment, the operator looks at an indicator on the tilt sensor 366 (e.g., a bubble) to determine movement. In another embodiment, the operator moves the arm segments in a prescribed motion and observes the change in the readings of the tilt sensor 366 in response. In a properly mounted AACMM 100, the changes in the readings of the tilt sensor 366 are expected to be small. The mount stability diagnostic test described herein (also referred to herein as an "inclinometer stability test") is facilitated by logic (e.g., software, hardware) located on the electronic circuit of the AACMM 100.

In another embodiment, the measurement device on the AACMM 100 is held steady in a nest while the pressure is being applied to the mounting device 120. In an embodiment, the nest for the measurement device (e.g., the probe) can be mounted at a location. The location of the nest does not change once it is mounted at a location. A first data point is calculated based on position signals from the transducers received prior to the pressure being applied and a second data point is calculated based on position signals received after the pressure has been applied. If the difference in the readings of the first data point and the second data point are close enough (within a programmable threshold difference), then the mount is determined to be stable. If the first data point and the second data point are outside of the programmable threshold difference, then the mount is determined to be not stable. If the mount is stable, then the operator may proceed to measure data points with the AACMM 100. If the mount is not stable, then the electronic circuit may output an error message. The error message may be indicated, for example, on the built-in display screen, such as the LCD 338 or a light on the AACMM 100.

If the operator selects "Temperature" on FIG. 13, a temperature stability diagnostic test is executed using input from temperature sensors (e.g., temperature sensors 212) located on the AACMM 100. In an embodiment, logic located on the electronic circuit of the AACMM 100 monitors the temperature sensors and outputs the temperatures indicated by the temperature sensors to a display device for operator viewing. Once the temperatures have stabilized for a programmable period of time, the AACMM 100 is considered to be in a stable state and the operator may proceed to measure data points with the AACMM 100. If the temperatures are not stable within the programmable period of time, then the electronic circuit may output an error message. The error message may be indicated to the operator via a light on the AACMM 100, and/or via the display device on the AACMM 100. In an embodiment, the temperature stability test is initiated automatically when the AACMM 100 is powered on.

In an embodiment, the AACMM 100 is not considered to be stable until two or more diagnostic tests are performed and both indicate a stable state. In an embodiment, there are two primary diagnostic tests: temperature stability (e.g., is the arm warmed up?) and mounting stability (e.g., are the arm and work surface physically stable relative to the part to be measured?). In an embodiment, there is a level indicator (e.g., a bubble level, a tilt sensor) that can be used to determine if the work surface is level; however, the work surface being level is not critical to AACMM 100 accuracy. In an embodiment, the arm diagnostic tests are performed by software code that takes advantage of sensors and data that AACMM 100 provides.

Figure 14:
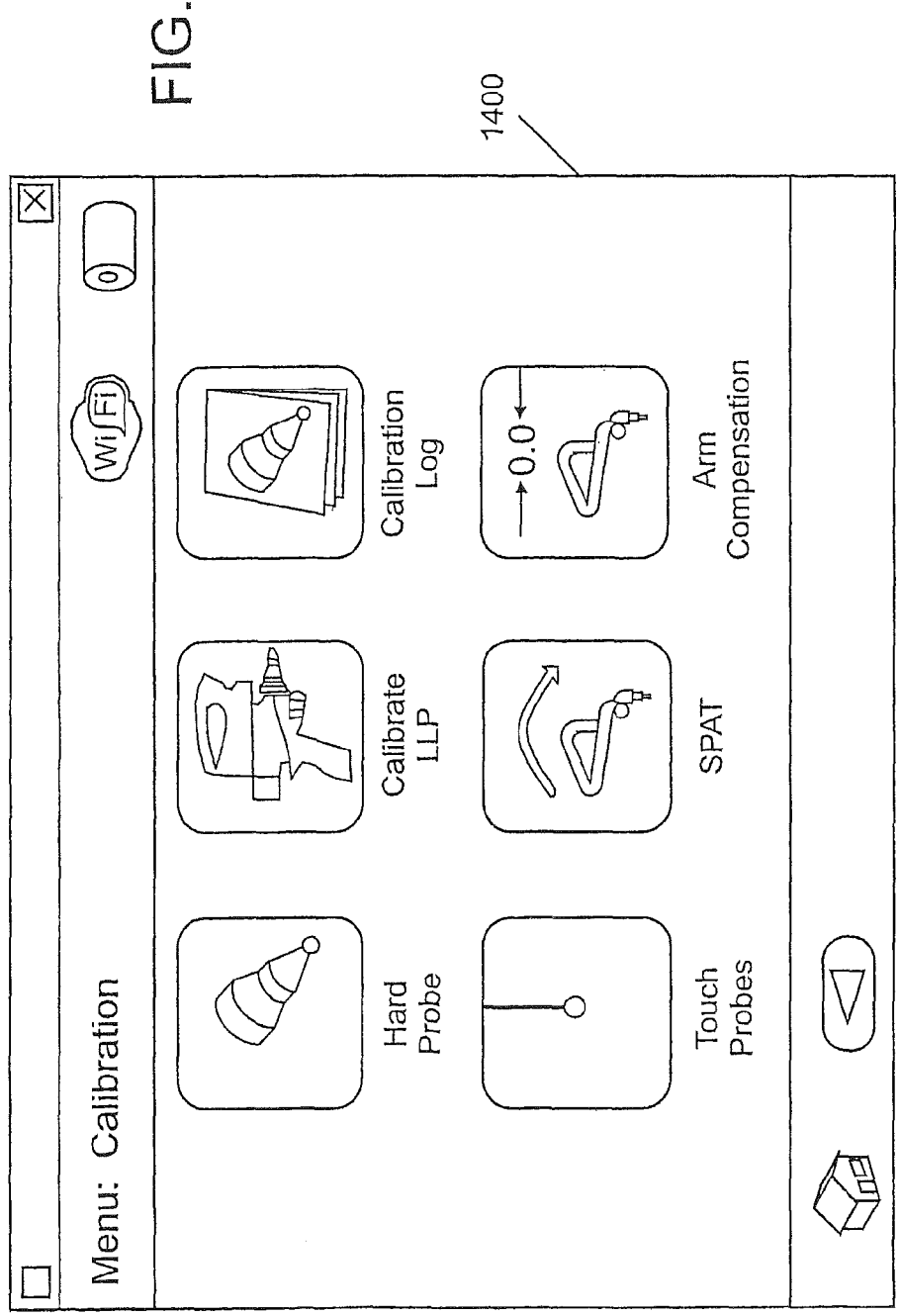
FIG. 14 is a user interface screen presented to an operator when performing calibration in accordance with an embodiment.

The SPAT may be performed as a diagnostic or calibration procedure (FIG. 14). As a diagnostic procedure, the SPAT may provide pass/fail information indicating whether the AACMM 100 is operating within the manufacturer's specifications. As a calibration procedure, the AACMM 100 may provide details on the performance of the SPAT or it may change a parameter in response to the SPAT results.

FIG. 14 is a calibration user interface screen 1400 presented to an operator when the operator is performing calibration in accordance with an embodiment. As shown in FIG. 14, the operator is given the option to calibrate a hard probe, an LLP, and/or a touch probe. In addition, the operator may view a calibration log of previous calibration results.

The operator may choose, via the user interface screen 1400 of FIG. 14, to perform a hard probe calibration. Such a calibration includes placing the hard probe in a nest that constrains the center of the AACMM probe tip to a single point in space. The operator moves the arm segments in a prescribed pattern as indicated by a figure on the built-in display (e.g., LCD 338). As the probe tip is moved, the user interface may progress to new patterns of movement. When enough information has been collected, the user interface program will indicate whether the probe calibration has been successful, and other details may also be given. The purpose of the hard probe calibration is to provide information on the position of the probe tip relative to the AACMM 100 to which it is attached.

The user may elect to calibrate a laser line probe (LLP). Such a calibration may involve a variety of steps such as sweeping a stripe of laser light from the LLP across a flat surface. The display (e.g., LCD 338) may provide guidance in the measurements to be made. After the user performs the indicated actions, the user interface screen may indicate whether the calibration has been successful, and it may also provide other details such as error values.

The user may elect to perform a quick (or field) arm compensation, labeled "arm compensation" in FIG. 14. This type of compensation is performed following relatively quick procedures by the operator. Such procedures may include performing a SPAT test, measuring an artifact having a known distance, or performing some other type of measurement. The user interface screen may provide guidance to the operator in performing the quick compensation procedure. When the procedure is completed, the display may indicate whether the procedure was successful or unsuccessful. It may ask permission to install new parameters into the AACMM 100, or it may automatically install new parameters. The objective of this procedure is to improve articulated arm accuracy.

Figure 15:
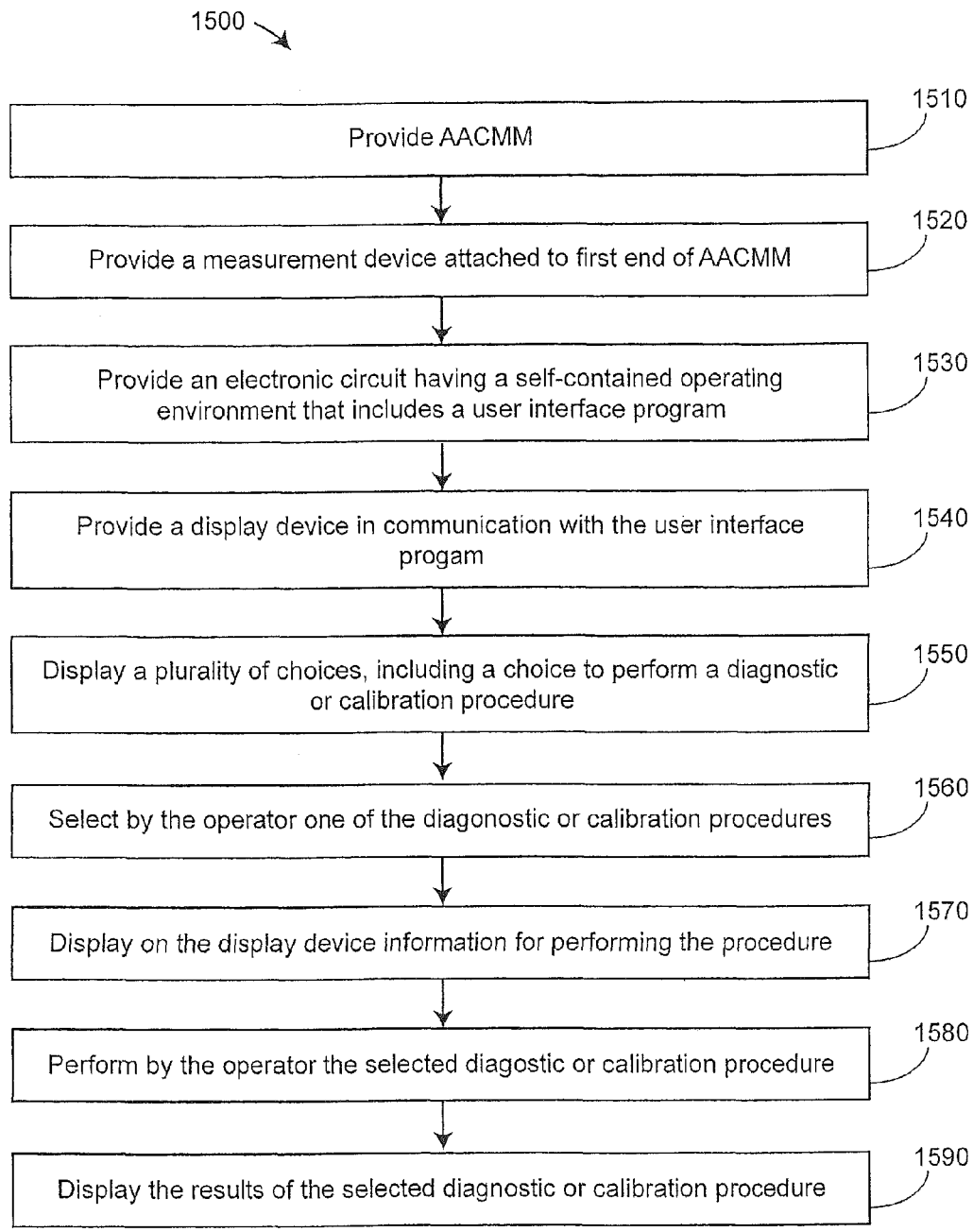
FIG. 15 is a flow diagram of a process for performing a diagnostic or calibration procedure in accordance with an embodiment.

A calibration process which may be performed in accordance with an embodiment is shown in FIG. 15. The test procedure 1500 shown in FIG. 15 starts at block 1510 with providing an AACMM 100 that includes a manually positionable articulated arm portion having opposed first and second ends, the arm portion including a plurality of connected arm segments, each of the arm segments including at least one position transducer for producing position signals.

At block 1520 a measurement device attached to the first end of the AACMM 100 is provided. Such a measurement device might be a hard probe, a touch trigger probe, or an LLP, for example.

At block 1530, an electronic circuit (e.g., electronic data processing system 210) that includes a processor is provided. The electronic circuit is configured to receive the position signals from the transducers and to provide data corresponding to a position of the measurement device. The electronic circuit has a self-contained operating environment for the AACMM 100, and the self-contained operating environment includes a user interface application. In addition to the usual function of collecting transducer data and converting this data to three-dimensional coordinates, a processor within the electronic circuit also provides a self-contained operating environment (i.e., an operating system) that supports a user interface program. The user interface program provides the user interface screens shown in FIGS. 5-14. The user interface program may also carry out other functions related to the built-in display, and it may carry out calculations related to the functions performed when the user presses selected icons on the user interface screens.

At block 1540, a display device in communication with the user interface program is provided. The display device may be LCD 338 supported by display processor 328. It is a built-in display that is an integral part of the AACMM 100. Because the operating environment that supports that user interface program is self-contained, the AACMM 100 may be used without attaching the AACMM 100 to an external computer, thereby simplifying setup and performance of measurements in many cases.

At block 1550 a plurality of choices are displayed on the display device, with at least one of the choices being to perform a diagnostic or calibration procedure for the AACMM 100. Typically, the choices will be presented in the form of icons, as depicted in FIGS. 5-14.

At block 1560 an operator selects one of the diagnostic or calibration procedures. Not every selection presented on one of the user interface screens of FIGS. 13 and 14 will necessarily contain all of the steps shown in the flow diagram of FIG. 15. For example, the icon on FIG. 13 labeled "System Info" provides information to the operator but does not require that the operator perform a procedure according to a prescribed sequence of steps.

At block 1570 information for performing the procedure is displayed on the display device. In some cases, the information may be presented in the form of illustrations-either static or dynamic illustrations-indicating the actions to be taken by the operator. In other cases, the information may be in the form of a text description.

At block 1580 the operator performs the selected diagnostic or calibration procedure. In some cases, feedback on the display may be presented to the user indicating whether the actions being taken are those desired. For example, in the probe calibration of the single point articulation test, the program may monitor the angles of the joints within the arm and provide an indication of whether the correct movements are being performed. Other feedback such as audio feedback (beeps, voice messages, and the like) may be used to supplement feedback provided on the display.

At block 1590 the results of the selected diagnostic or calibration procedure are displayed on the display device. In some cases, the results may be in the form of a pass/fail message indicating whether, in the case of a diagnostic procedure, the AACMM 100 is performing as expected or whether, in the case of a compensation procedure, the new compensation parameters were successfully found and installed. In other cases, the results may include more detailed information such as the observed errors. It may also include an inquiry in which the operator is asked, for example, whether calculated parameters should be installed.

Advantages of performing the diagnostics and/or calibration solely on the AACMM 100 without requiring a personal computer (PC) to calculate coordinate data (e.g., x,y,z data) from position signals include: no extra equipment to carry or place in a work area; no wires or wireless interface to a PC required; no PC to buy, damage, or lose; and no issues with hardware and software compatibility because the software system is integrated with the hardware. Additional advantages include: the ability to perform quick measurements in the middle of a lengthy measurement session on a PC without interrupting work flow or losing data (the systems operate independently); a means to quickly validate measurements taken on PC based software; a faster, simpler, user interface (UI) for quick measurements that are not possible on a PC based system; and access to arm sensor data through a direct hardware interface which is not possible with a PC. Further advantages include control of wireless interface options through a direct hardware interface which is not possible via wireless remote devices (i.e., a PC cannot change arm Wi-Fi settings while communicating via Wi-Fi).

The user interface screens shown and described herein are examples of high level screens that are used by an exemplary embodiment. Other screens (different content, additional content, presented in a different order) including additional sub-screens may be implemented by exemplary embodiments. In addition, the terms screen and sub-screen are intended to cover any method of providing the data such as, but not limited to pop-up menus and selection lists.

Technical effects and benefits include having a self-contained portable AACMM 100 that does not require a connection to an external computer for calculating position data from the raw measurement data collected by the AACMM 100. In addition, an external computer is not required for providing a user interface application to allow the operator to give instructions to the AACMM 100. A benefit is that a single device, the stand-alone portable AACMM 100 is all that is required to collect and report on measurement data. An additional benefit is that the AACMM 100 is only required to support one operating system/operating system level (i.e., the one that is being used by the self-contained operating environment). In addition, troubleshooting is easier because the entire environment is known and there is no variation in operation due to different operating environments (e.g., different operating systems, software, etc. installed on the external computers).

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that may contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++, C# or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, may be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer readable medium that may direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, may be implemented by special purpose hardware-based systems that perform the specified functions or acts, or combinations of special purpose hardware and computer instructions.

While the invention has been described with reference to example embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed is:

1. A method for performing a diagnostic or calibration procedure on an articulated arm coordinate measurement machine (AACMM), the method comprising:
providing the AACMM, the AACMM having a manually positionable articulated arm portion having opposed first and second ends, the arm portion including a plurality of connected arm segments, each of the arm segments including at least one position transducer for producing position signals;
providing a measurement device attached to the first end of the AACMM;
providing an electronic circuit in the AACMM, the electronic circuit including a processor, the electronic circuit configured to receive the position signals from the transducers and to provide data corresponding to a position of the measurement device, the electronic circuit having a self-contained operating environment for the AACMM, the self-contained operating environment including a user interface application;
providing a display device attached to the AACMM, the display device and the electronic circuit being an integral part of the AACMM, the display device in communication with the user interface application;
displaying on the display device a plurality of choices, at least one of the choices being to perform a diagnostic or calibration procedure for the AACMM;
selecting one of the diagnostic or calibration procedures responsive to input from an operator;
displaying on the display device information for performing the procedure;
performing, responsive to input from the operator, the selected diagnostic or calibration procedure; and
displaying on the display device results of the selected diagnostic or calibration procedure.

2. The method of performing a diagnostic or calibration procedure of claim 1 wherein the input from the operator includes input from a touch screen of the display device.

3. The method of performing a diagnostic or calibration procedure of claim 1 wherein the displaying on the display device a plurality of choices includes at least one choice from among a mount stability diagnostic procedure, a single point articulation test (SPAT) diagnostic procedure, a hard probe calibration procedure, a laser line probe (LLP) calibration procedure, a touch probe calibration procedure, a SPAT calibration procedure, and a quick arm compensation procedure.

4. The method of performing a diagnostic or calibration procedure of claim 3, wherein:
the selecting of one of the diagnostic or calibration procedure includes selecting the mount stability diagnostic procedure;
the displaying on the display device information for performing the procedure includes an indication that force is to be applied to a prescribed portion of the AACMM in a prescribed manner or an indication that arm segments are to be moved in a prescribed manner; and
the displaying on the display device results of the diagnostic or calibration procedure includes indicating whether the articulated arm coordinate measurement machine is considered stable or unstable.

5. The method of performing a diagnostic or calibration procedure of claim 3, wherein:
the selecting of one of the diagnostic or calibration procedure includes selecting the mount stability diagnostic procedure;
the displaying on the display device information for performing the procedure includes an indication that a probe tip is to be placed in a nest and force is to be applied to a prescribed portion of the AACMM in a prescribed manner; and
the displaying results of the diagnostic or calibration procedure includes indicating whether the articulated arm coordinate measurement machine is considered stable or unstable.

6. The method of performing a diagnostic or calibration procedure of claim 3, wherein:
the selecting of one of the diagnostic or calibration procedure includes selecting SPAT diagnostic procedure or the SPAT calibration procedure;
the displaying on the display device information for performing the procedure includes indicating whether the arm segments have been moved more than a predetermined amount; and
the displaying results of the diagnostic or calibration procedure includes displaying an error value or displaying whether performance of the AACMM is inside or outside a specification.

7. The method of performing a diagnostic or calibration procedure of claim 3, wherein:
the selecting of one of the diagnostic or calibration procedure includes selecting the hard probe calibration procedure;
the displaying on the display device information for performing the procedure includes displaying a figure showing a movement to be made by the operator and providing feedback to indicate when the desired movement has been performed; and
the displaying results of the diagnostic or calibration procedure includes indicating an error value or indicating whether the hard probe calibration procedure was successful.

8. The method of performing a diagnostic or calibration procedure of claim 3, wherein:
the selecting of one of the diagnostic or calibration procedure includes selecting the LLP calibration procedure;
the displaying on the display device information for performing the procedure includes displaying a figure showing how a laser line probe is to be moved over an object and providing feedback to indicate when the desired movement has been performed; and
the displaying results of the diagnostic or calibration procedure includes indicating an error value or indicating whether the LLP calibration procedure was successful.

9. The method of performing a diagnostic or calibration procedure of claim 3, wherein:
the selecting by an operator one of the diagnostic or calibration procedure includes selecting the quick arm compensation procedure;
the displaying on the display device information for performing the procedure includes information on the movement to be performed; and
the displaying results of the diagnostic or calibration procedure includes indicating an error value or indicating that the quick arm compensation results were applied to change at least one compensation parameter of the AACMM.

* * * * *